US008600828B2

(12) United States Patent
Bonner et al.

(10) Patent No.: US 8,600,828 B2
(45) Date of Patent: *Dec. 3, 2013

(54) METHODS OF ACQUIRING ACTUAL REAL-TIME SHOPPER BEHAVIOR DATA APPROXIMATE TO A MOMENT OF DECISION BY A SHOPPER

(75) Inventors: Brett Bracewell Bonner, New Richmond, OH (US); Christopher Todd Hjelm, Cincinnati, OH (US); Titus Arthur Jones, Hebron, KY (US); John Edward Osborne, II, Indian Springs, OH (US); Dion Brent Perkins, Cincinnati, OH (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,715

(22) Filed: May 18, 2012

(65) Prior Publication Data
US 2012/0245974 A1 Sep. 27, 2012

Related U.S. Application Data

(63) Continuation of application No. 12/778,346, filed on May 12, 2010, now Pat. No. 8,195,519, which is a continuation of application No. 12/408,581, filed on Mar. 20, 2009, now Pat. No. 7,742,952, which is a continuation-in-part of application No. 12/353,817, filed on Jan. 14, 2009, now Pat. No. 7,734,513, and a continuation-in-part of application No. 12/353,760, filed on Jan. 14, 2009, now Pat. No. 7,739,157, and a continuation-in-part of application No. 12/172,326, filed on Jul. 14, 2008, now Pat. No. 7,672,876, and a continuation-in-part of application No. 11/859,703, filed on Sep. 21, 2007, now abandoned.

(60) Provisional application No. 61/070,344, filed on Mar. 21, 2008.

(51) Int. Cl.
G06Q 30/00 (2012.01)
(52) U.S. Cl.
USPC ........................................ 705/26.1
(58) Field of Classification Search
USPC .................. 705/26.1, 27.1; 370/406
See application file for complete search history.

(56) References Cited

U.S. PATENT DOCUMENTS 4,929,819 A 5/1990 Collins, Jr.
5,294,781 A 3/1994 Takahashi et al.
(Continued)

FOREIGN PATENT DOCUMENTS

CA 2 556 778 9/2005
CN 1953408 4/2007
(Continued)

OTHER PUBLICATIONS

Office Action as issued in Canadian Patent Application No. 2,709,757, dated Oct. 19, 2011.
(Continued)

Primary Examiner — Brandy A Zukanovich
(74) Attorney, Agent, or Firm — Pillsbury Winthrop Shaw Pittman LLP

(57) ABSTRACT

The invention provides methods of acquiring actual real-time shopper behavior data during product selection of purchasable items by a shopper in a store. More specifically, disclosed herein are methods of using a communications multi-network, a First Moment of Truth device and a data collection device to track actual real-time shopper behavior data relating to the presumed locations of shoppers in a store, the time spent and location of time spent by a shopper while considering a purchasable item and products chosen for purchase.

18 Claims, 23 Drawing Sheets

(56) References Cited

U.S. PATENT DOCUMENTS

| | | |
|---|---|---|
| 5,434,775 A | 7/1995 | Sims et al. |
| 5,630,071 A | 5/1997 | Sakai et al. |
| 5,825,002 A | 10/1998 | Roslak |
| 5,918,211 A | 6/1999 | Sloane |
| 5,995,015 A | 11/1999 | DeTemple et al. |
| 6,032,127 A | 2/2000 | Schkolnick et al. |
| 6,119,935 A | 9/2000 | Jelen et al. |
| 6,236,335 B1 | 5/2001 | Goodwin, III |
| 6,347,079 B1 | 2/2002 | Stephens et al. |
| 6,382,357 B1 | 5/2002 | Morrison et al. |
| 6,522,641 B1 | 2/2003 | Siu et al. |
| 6,587,835 B1 | 7/2003 | Treyz et al. |
| 6,659,344 B2 | 12/2003 | Otto et al. |
| 6,725,206 B1 | 4/2004 | Coveley |
| 6,820,062 B1 | 11/2004 | Gupta et al. |
| 6,837,436 B2 | 1/2005 | Swartz et al. |
| 6,879,574 B2 | 4/2005 | Naghian et al. |
| 6,895,330 B2 | 5/2005 | Cato et al. |
| 6,959,862 B2 | 11/2005 | Neumark |
| 7,006,982 B2 | 2/2006 | Sorensen |
| 7,076,441 B2 | 7/2006 | Hind et al. |
| 7,084,765 B2 | 8/2006 | Clapper |
| 7,089,020 B2 | 8/2006 | Asthana et al. |
| 7,167,799 B1 | 1/2007 | Dolgov et al. |
| 7,209,754 B2 | 4/2007 | Niu et al. |
| 7,240,834 B2 | 7/2007 | Kato et al. |
| 7,245,214 B2 | 7/2007 | Smith |
| 7,263,378 B2 | 8/2007 | Inselberg |
| 7,283,048 B2 | 10/2007 | Stilp |
| 7,301,455 B2 | 11/2007 | McKenna et al. |
| 7,309,009 B2 | 12/2007 | Singer-Harter |
| 7,343,317 B2 | 3/2008 | Jokinen et al. |
| 7,390,264 B2 | 6/2008 | Walker et al. |
| 7,413,121 B2 | 8/2008 | Goel et al. |
| 7,416,123 B2 | 8/2008 | Saperstein et al. |
| 7,420,464 B2 | 9/2008 | Fitzgerald et al. |
| 7,443,295 B2 | 10/2008 | Brice et al. |
| 7,463,143 B2 | 12/2008 | Forr et al. |
| 7,475,813 B2 | 1/2009 | Swanson, Sr. |
| 7,503,477 B2 | 3/2009 | Johnson |
| 7,504,937 B2 | 3/2009 | McKenna et al. |
| 7,672,876 B2 | 3/2010 | Bonner et al. |
| 7,734,513 B2 | 6/2010 | Bonner et al. |
| 7,739,157 B2 | 6/2010 | Bonner et al. |
| 7,742,952 B2 | 6/2010 | Bonner et al. |
| 7,873,543 B2 | 1/2011 | Perrier et al. |
| 7,966,228 B2 | 6/2011 | Perrier et al. |
| 8,001,015 B2 | 8/2011 | Perrier et al. |
| 2001/0028301 A1 | 10/2001 | Geiger et al. |
| 2002/0002504 A1 | 1/2002 | Engel et al. |
| 2002/0161658 A1 | 10/2002 | Sussman |
| 2002/0174025 A1 | 11/2002 | Hind et al. |
| 2003/0171944 A1 | 9/2003 | Fine et al. |
| 2003/0217137 A1 | 11/2003 | Roese et al. |
| 2004/0029558 A1 | 2/2004 | Liu |
| 2004/0111454 A1 | 6/2004 | Sorensen |
| 2004/0235468 A1 | 11/2004 | Luebke et al. |
| 2005/0021704 A1 | 1/2005 | Larson et al. |
| 2005/0080894 A1 | 4/2005 | Apostolopoulos et al. |
| 2005/0136944 A1 | 6/2005 | Misikangas et al. |
| 2005/0216339 A1 | 9/2005 | Brazell et al. |
| 2005/0246196 A1 | 11/2005 | Frantz et al. |
| 2005/0256782 A1 | 11/2005 | Sands et al. |
| 2006/0009152 A1 | 1/2006 | Millard et al. |
| 2006/0125356 A1 | 6/2006 | Meek, Jr. et al. |
| 2006/0149628 A1 | 7/2006 | Chefalas et al. |
| 2006/0181458 A1 | 8/2006 | Niu et al. |
| 2006/0186973 A1 | 8/2006 | Satou |
| 2006/0193262 A1 | 8/2006 | McSheffrey et al. |
| 2006/0200378 A1 | 9/2006 | Sorensen |
| 2006/0244588 A1 | 11/2006 | Hannah et al. |
| 2006/0266825 A1 | 11/2006 | Do et al. |
| 2006/0282334 A1 | 12/2006 | Kao et al. |
| 2006/0289637 A1 | 12/2006 | Brice et al. |
| 2006/0293779 A1 | 12/2006 | Nishri |
| 2006/0293968 A1 | 12/2006 | Brice et al. |
| 2007/0027612 A1 | 2/2007 | Barfoot et al. |
| 2007/0055563 A1 | 3/2007 | Godsey et al. |
| 2007/0061041 A1 | 3/2007 | Zweig |
| 2007/0063837 A1 | 3/2007 | McKenna et al. |
| 2007/0073554 A1 | 3/2007 | Flinn et al. |
| 2007/0094080 A1 | 4/2007 | Wiken |
| 2007/0106775 A1 | 5/2007 | Wong |
| 2007/0118429 A1 | 5/2007 | Subotovsky |
| 2007/0121598 A1 | 5/2007 | McGary |
| 2007/0138268 A1 | 6/2007 | Tuchman |
| 2007/0142061 A1 | 6/2007 | Taubenheim et al. |
| 2007/0152812 A1 | 7/2007 | Wong et al. |
| 2007/0197881 A1 | 8/2007 | Wolf et al. |
| 2007/0210155 A1 | 9/2007 | Swartz et al. |
| 2007/0219866 A1 | 9/2007 | Wolf et al. |
| 2007/0239569 A1 | 10/2007 | Lucas et al. |
| 2007/0250613 A1 | 10/2007 | Gulledge |
| 2007/0283004 A1 | 12/2007 | Buehler |
| 2007/0293237 A1 | 12/2007 | Correal et al. |
| 2008/0025208 A1 | 1/2008 | Chan |
| 2008/0030319 A1 | 2/2008 | McKenna et al. |
| 2008/0032705 A1 | 2/2008 | Patel et al. |
| 2008/0040219 A1 | 2/2008 | Kim et al. |
| 2008/0040509 A1 | 2/2008 | Werb et al. |
| 2008/0041942 A1 | 2/2008 | Aissa |
| 2008/0042836 A1 | 2/2008 | Christopher |
| 2008/0056261 A1 | 3/2008 | Osborn et al. |
| 2008/0059297 A1 | 3/2008 | Vallier et al. |
| 2008/0074254 A1 | 3/2008 | Townsend et al. |
| 2008/0113614 A1 | 5/2008 | Rosenblatt |
| 2008/0147461 A1 | 6/2008 | Lee et al. |
| 2008/0170580 A1 | 7/2008 | Goldman et al. |
| 2008/0189170 A1 | 8/2008 | Ramachandra |
| 2008/0203161 A1 | 8/2008 | Goel et al. |
| 2008/0228600 A1 | 9/2008 | Treyz et al. |
| 2008/0313938 A1 | 12/2008 | Sonnendorfer et al. |
| 2009/0192893 A1 | 7/2009 | Eldarkhanova et al. |
| 2010/0057541 A1 | 3/2010 | Bonner et al. |
| 2010/0262513 A1 | 10/2010 | Bonner et al. |
| 2011/0169715 A1 | 7/2011 | Goel et al. |

FOREIGN PATENT DOCUMENTS

| | | |
|---|---|---|
| EA | 200970003 A1 | 4/2009 |
| JP | 02-309494 A | 12/1990 |
| JP | 04-372098 | 12/1992 |
| JP | 08-290774 | 11/1996 |
| JP | 11-152041 | 6/1999 |
| JP | 2001-230876 | 8/2001 |
| JP | 2003-223548 A2 | 8/2003 |
| JP | 2005-309601 A2 | 11/2005 |
| JP | 2006-011617 | 1/2006 |
| JP | 2006-198431 | 8/2006 |
| JP | 2006-524329 | 10/2006 |
| JP | 2006-309280 A2 | 11/2006 |
| JP | 2007-272399 | 10/2007 |
| JP | 2007-300572 | 11/2007 |
| KR | 4028108 A | 4/2004 |
| RU | 2162245 | 1/2001 |
| RU | 2164039 C1 | 3/2001 |
| RU | 2311682 C1 | 11/2007 |
| RU | 2432285 C2 | 1/2010 |
| RU | 2006110548 | 2/2010 |
| WO | WO-9914694 A1 | 3/1999 |
| WO | WO-03075125 A2 | 9/2003 |
| WO | WO 2004/096050 | 11/2004 |
| WO | WO-2006137065 A2 | 12/2006 |
| WO | WO-2007002941 A2 | 1/2007 |
| WO | WO-2007085826 A1 | 8/2007 |

OTHER PUBLICATIONS

Tamura, Hiroshi et al., "Designing Ubiquitous Shopping Support Systems Based on Human-Centered Approach", *HCI International 2007,* Beijing, China, Jul. 22-27, 2007; entire doc; esp abstract, p. 220, para 8; p. 221, Fig. 2 and para 3.

Japanese Office Action dated Mar. 2, 2011 issued in Japanese Patent Application No. 2011-500817.

(56) References Cited

OTHER PUBLICATIONS

Repas, Robert, "Industrial Sensing the Wireless Way," Jan. 6, 2005, Machine Design, v77n1, pp. 104, 106, 108, 110.

Chediak, Mark, "Retail Technology; Grocers Get a Taste of Future; Store Owners Who Want to Stand Out in the Crowd These Days are Embracing Cutting Edge Services," Jan. 21, 2006.

International Search Report and Written Opinion of the International Searching Authority as issued for International Application No. PCT/US11/44000, dated Dec. 16, 2011.

Japanese Office Action dated Dec. 15, 2010 issued in Japanese Patent Application No. 2010-542292.

Search Report and Documentary Conclusion as issued in Georgian Patent Application No. AP 2009 011919, dated Apr. 4, 2012.

Georgian Search Report and Documentary Conclusion as issued for Georgian Patent Application No. AP 2009 012240, dated Oct. 25, 2012.

Georgian Search Report and Documentary Conclusion as issued for Georgian Patent Application No. AP 2009 012241, dated Nov. 6, 2012.

Georgian Search Report as issued for Georgian Patent Application No. AP 2009 012006, dated Oct. 10, 2012.

Office Action as issued for Chinese Patent Application No. 2009801022876, dated Oct. 19, 2012.

METHODS OF ACQUIRING ACTUAL REAL-TIME SHOPPER BEHAVIOR DATA APPROXIMATE TO A MOMENT OF DECISION BY A SHOPPER

CLAIMS PRIORITY TO RELATED APPLICATIONS

This application is a continuation of U.S. application Ser. No. 12/778,346, filed on May 12, 2010, and issued as U.S. Pat. No. 8,195,519 on Jun. 5, 2012, which is a continuation of U.S. application Ser. No. 12/408,581, filed Mar. 20, 2009 and issued as U.S. Pat. No. 7,742,952 on Jun. 22, 2010, which claims the benefit of U.S. Provisional application Ser. No. 61/070,344, filed on Mar. 21, 2008, and which is a continuation-in-part of U.S. application Ser. No. 12/353,817, filed on Jan. 14, 2009 and issued as U.S. Pat. No. 7,734,513 on Jun. 8, 2010, U.S. application Ser. No. 12/353,760, filed on Jan. 14, 2009 and issued as U.S. Pat. No. 7,739,157 on Jun. 15, 2010, U.S. application Ser. No. 12/172,326, filed on Jul. 14, 2008 and issued as U.S. Pat. No. 7,672,876 on Mar. 2, 2010, and U.S. application Ser. No. 11/859,703, filed on Sep. 21, 2007. This application cross-references and incorporates by reference U.S. application Ser. No. 12/778,346, filed on May 12, 2010, now allowed, U.S. application Ser. No. 12/408,581, filed Mar. 20, 2009 and issued as U.S. Pat. No. 7,742,952 on Jun. 22, 2010, U.S. Provisional application Ser. No. 61/070,344 filed on Mar. 21, 2008, U.S. application Ser. No. 12/353,817, filed on Jan. 14, 2009 and issued as U.S. Pat. No. 7,734,513 on Jun. 8, 2010, U.S. application Ser. No. 12/353,760, filed on Jan. 14, 2009 and issued as U.S. Pat. No. 7,739,157 on Jun. 15, 2010, U.S. application Ser. No. 12/172,326, filed on Jul. 14, 2008 and issued as U.S. Pat. No. 7,672,876 on Mar. 2, 2010, and U.S. application Ser. No. 11/859,703, filed on Sep. 21, 2007.

FIELD OF THE INVENTION

The invention herein provides methods for gathering actual real-time shopper behavior data while a shopper shops in a store. In particular, methods for acquiring shopper behavior data during the course of a shopper's product selection in a store are provided for improved methods of influencing a shopper's future product selections before, during and after the First Moment of Truth.

BACKGROUND OF THE INVENTION

Understanding shopper behavior in a store has become paramount to retailers, merchandisers, data gatherers and those in the business of operating warehouses. To date, understanding and then later predicting shopper behavior at the point of decision, i.e., the first moment of truth, has been elusive. Also elusive has been knowledge of the paths taken by shoppers in a store. Typically, the only consistent actual data known has been that data gained after a shopper has purchased multiple items and then left the store; i.e., data gathering at the point of sale (POS) or sometime afterwards. Persons of ordinary skill in the art have rightly followed up such purchases with interviews in order to gain further insight, but such interviews still miss the mark for "in the moment" or "real-time" shopper behavior, real-time shopper behavioral perspectives, and for knowing the actual and decisional paths taken by shoppers in a store.

The first moment of truth (FMOT) has been-defined as product selection which includes 1) the product considered for selection, 2) the product actually selected, 3) the amount of time that a shopper expends to consider a particular product or products for selection, and 4) a shopper's presumed location in a store in relation to a product location at a shopper's moment of decision.

The amount of time that a shopper expends to consider a particular product or products for selection is generally thought to range from about three to about seven seconds, but varies from shopper to shopper. A person of skill in the art will understand these variances more fully. Regardless of the actual time required, the FMOT includes a shopper's decisional process in a store, at the store shelf, end cap, kiosk, stand alone display, a store within a store, or other means of display known to those of skill in the art.

Merchandisers who sell their wares in retail stores spend billions of dollars per year seeking to understand and influence shoppers' behavior during the FMOT and while shoppers travel along their paths in a store. Up until now, real-time empirical understanding about how shoppers behave and what, if anything, influences shoppers during the First Moment of Truth remains a mystery.

While seeking to understand shopper behavior at the FMOT is important, it is also important to provide a method for such discovery that can be consistently applied, provides a whole picture of a shopper's shopping experience, works well, is reproducible and that is truly a measure of the entirety of a shopper's in-store experience.

The prior art provides that the use of RFID to track the movement of products in a store can be useful. Persons of ordinary skill in the art using RFID on products in retail environments will readily acknowledge that less than 10% and often less than 2% of all products in a retail environment (e.g., grocery store) contain RFID tags. Even if RFID tags are attached to shopping carts, such attachment does not provide useful information about what a shopper selects from store shelves, end-caps, etc., but rather where the shopping cart has traveled within the store. Such an approach therefore provides no shopper product selection insights.

In U.S. Pat. No. 6,659,344, a system is provided that gathers data on the behavior of shoppers in a retail market. Herein, a scanner is attached to a shopping basket and is configured to detect, through RFID, the removal of an item from a shelf whereby such items are also equipped with one or more RFID tags. An obvious limitation to this approach, again, is the limited use of available RFID tags on products within a store. By dependence upon RFID, it is unlikely that much useful shopper behavior data can be gathered from which shopper insights may be gained.

What remains therefore is the need for a method by which actual and/or real-time shopper behavior data may be culled through the ability to track a shopper's location throughout a store in real-time, knowledge of which items a shopper has selected for purchase, knowledge of where in the store a shopper has selected an item for purchase, knowledge of how long the decisional process has been for each product selected by a shopper for purchase. Also important is the use of all such real-time shopper behavior data to enhance computer-aided simulation models. Such inclusion would serve to enhance accuracy of computer simulations that predict shopper behavior.

SUMMARY OF THE INVENTION

Accordingly, the invention provides at least one method for acquiring actual real-time shopper behavior data approximate to a moment of decision by a shopper in a store filled with one or more purchasable items. The method includes the step of providing a First Moment of Truth (FMOT) device that is adapted to be communicatively coupled to the communications multi-network in the store. The method further comprises the step of providing a communications multi-network positioned about the store. The communications multi-network comprises at least one data collection device configured to receive and store the actual real-time shopper behavior data, at least one mesh communication network for the transfer of location tracking data between the location tracking device and the data collection device, and at least one star communication network for the transfer of the actual real-time shopper behavior data between the First Moment of Truth device and the data collection device.

In exemplary embodiments, the method further includes the step of transferring actual real-time shopper behavior data through the star communication network of the communications multi-network to the data collection device. Furthermore, the method includes the step of creating location tracking data using the location tracking device of the First Moment of Truth device. Next, the location tracking data is transferred through the mesh communication network of the communications multi-network to the data collection device. Next, the data collection device stores the actual real-time shopper behavior data and historical progression data, the historical progression data comprising substantially all the location tracking data created by the location tracking device of said First Moment of Truth device.

Preferably, the system transmits one or more influencing messages to the First Moment of Truth device in order to influence a shopper's decision making before, during or after the shopper's moment of decision of one or more purchasable items.

When a shopper uses a First Moment of Truth device, it is then enabled to track the shopper's response or non-response to one or more influencing messages. Such response or non-response is then recorded and stored as part of the shopper's real-time shopper behavior data. In an alternative embodiment herein, the influencing message delivered to the shopper by the system herein is delivered to the shopper through a communications device not including the First Moment of Truth device; e.g., a cell phone, PDA or wireless enabled mp3 device.

In exemplary embodiments, actual real-time shopper behavior data includes the shopper's identification data, the location tracking data and the product scanning data. Actual real-time shopper behavior data herein comprises the identity of one or more purchasable items considered for purchase, the amount of time taken by a shopper to choose or not choose one or more purchasable items, and the shopper's presumed location in the store. Also, the actual real-time shopper behavior data comprises the identity of the one or more purchasable items chosen for actual purchase by the shopper. In the event that a shopper, who has chosen an item for purchase changes her mind prior to purchase, such decision is also preferably recorded as part of the actual real-time shopper behavior data and that item is marked as "unchosen".

As has been noted hereinabove, the method comprises one or more data collection devices. The actual real-time shopper behavior data is transmitted to one or more data collection devices each of which is communicatively coupled to the communications multi-network. In practice, the data collection device acquires and organizes the actual real-time behavior shopper data.

While shopping, the shopper's presumed location is known. Such presumed location is gained from a First Moment of Truth device held in proximate position to the shopper. The preferred manner in which a shopper's presumed location is known is through continuous or substantially continuous location tracking. Namely, the First Moment of Truth device comprises a location tracking device that creates location tracking data during the course of a shopper's time in a store. Preferably, the data collection device stores historical progression data that consists of location tracking data. Alternately, all or at least a portion of the location tracking data can be stored in the First Moment of Truth device.

In practice, location tracking data is collected starting from about the time the location tracking device is associated with the communications multi-network to about the time the location tracking (FMOT) device dissociates from the communications multi-network.

In exemplary embodiments, the method comprises the step of configuring the FMOT device to function as a product scanning device to transmit product scanning data. Next, the readable medium, located on the one or more purchasable items, is scanned. Then, the product scanning data is generated by the FMOT device as the readable media of the purchasable items is scanned by the FMOT device. The product scanning data is transmitted from the FMOT device through the communications multi-network to the data collection device for analysis in real time.

The exemplary method includes the step of the FMOT device recording a moment in time corresponding to when the FMOT device creates the product scanning data; the FMOT device creates product scanning timing data during this step of recording. The exemplary method further comprises the step of recording a moment in time when the location tracking data is created, the recording being conducted by the FMOT device to create location tracking timing data. Next, the FMOT device transmits the location tracking timing data to the data collection device.

Next, the data collection device identifies a match between the product scanning timing data, corresponding with the moment in time when the data collection device receives the product scanning data, and the location tracking timing data, corresponding with the moment in time when the location tracking data is created. Finally, the product scanning data is associated with the location tracking data when a match is identified.

In exemplary embodiments, the method comprising the steps of providing a timing device associated with the data collection device and calculating a shopper's average rate of travel in the store. Such calculation is based on shopping trip timing data of at least a shopper's first shopping trip and a shopper's location tracking data.

Next, the shopper's actual real-time rate of travel in the store during a shopper's second shopping trip is calculated and tracked by the data collection device. The data collection device compares the shopper's actual real-time rate of travel during the shopper's second shopping trip with the shopper's average rate of travel, the step of comparing being conducted by the data collection device in substantially real-time. In the next step, the exemplary method of the process marks the beginning of a period of product selection when a shopper's actual real-time rate of travel is substantially slower than the shopper's average rate of travel based on the step of comparing and when the location tracking data indicates the shopper is substantially near a product display in the store.

The data collection device marks the conclusion of the period of product selection when the location tracking data indicates that a shopper is no longer substantially near the product display. Then, the duration of the period of product selection to generate product selection timing data is calculated by the data collection device. Lastly, the product selection timing data is organized in an electronic file with the actual real-time shopper behavior data by the data collection device.

In exemplary embodiments, the method may further include the step of transmitting one or more influencing messages to a shopper through her the FMOT device during the period of product selection through the star communication network in order to influence a shopper's decision.

BRIEF DESCRIPTION OF THE DRAWINGS

While the specification concludes with claims particularly pointing out and distinctly claiming the invention, it is believed that the embodiments will be better understood from the following description in conjunction with the accompanying Figures, in which like reference numerals identify like elements and in which:

DETAILED DESCRIPTION OF THE INVENTION

Figure 1A:
FIG. 1A-FIG. 1D provide a depiction of a shopper selecting at least one purchasable item from an end cap in a store during the shopper's moment of decision.

The invention herein provides a system for acquiring actual real-time shopper behavior data approximate to a moment of decision by a shopper in a store filled with one or more purchasable items. The system comprises a communications multi-network positioned about the store, at least one data collection device which is in operative communication with the communications multi-network, and a First Moment of Truth (FMOT) device that is adapted to be communicatively coupled to the communications multi-network in the store. The FMOT device is used to collect the actual real-time shopper behavior data approximate to the moment of decision by the shopper of one or more purchasable items. The preferred communications network is a multi-network.

Preferably, the system transmits one or more influencing messages to the FMOT device held by a shopper in order to influence shopper's decision making before, during or after the shopper's moment of decision of one or more purchasable items.

When a shopper uses a FMOT device, it is then enabled to track the shopper's response or non-response to one or more influencing messages. Such response or non-response is then recorded and stored as part of the shopper's real-time shopper behavior data. In an alternative embodiment herein, the influencing message delivered to the shopper by the system herein is delivered to the shopper through a communications device not including the FMOT device; e.g., a cell phone, PDA or wireless enabled mp3 device.

Actual real-time shopper behavior data herein comprises the identity of one or more purchasable items considered for purchase, the amount of time taken by a shopper to choose or not choose one or more purchasable items, and the shopper's presumed location in the store. Also, the actual real-time shopper behavior data comprises the identity of the one or more purchasable items considered for purchase and is then chosen by the shopper for actual purchase. In the event that a shopper, who has chosen an item for purchase changes her mind prior to purchase, such decision is also preferably recorded as part of the actual real-time shopper behavior data and that item is marked as "unchosen". Whatever choice a shopper makes, it is noted and recorded in real time.

As has been noted hereinabove, the system comprises one or more data collection devices. The actual real-time shopper behavior data is transmitted to one or more data collection devices each of which is communicatively coupled to the communications multi-network. In practice, the data collection device acquires and organizes the actual real-time shopper behavior data.

While shopping, a shopper's presumed location is known. Such location is known so long as the FMOT device assigned to the shopper and the shopper has the FMOT device held in proximate position to her. The preferred manner in which a shopper's presumed location is known is through continuous or substantially continuous location tracking. Namely, the FMOT device comprises a location tracking device or mechanism that creates location tracking data during the course of a shopper's time in a store. Preferably, the data collection device stores historical progression data that consists of location tracking data. Alternately, all or at least a portion of the location tracking data can be stored in the FMOT device.

In practice, the location tracking data is collected by the FMOT device starting from about the time the location tracking device is associated with the communications multi-network to about the time the location tracking device disassociates from the communications multi-network.

In the store, the one or more purchasable items comprise readable media thereon for scanning by the FMOT device. The readable media contains product identity information for each of the one or more purchasable items or a group of one or more purchasable items bound together; e.g., a six-pack of soda.

The term "actual real-time shopper behavior data" as used herein means the total sum of a shopper's identification data, location tracking data, product scanning data and product selection timing data Ideally, actual real-time shopper behavior data also includes a shopper's personal and demographic profile.

The terms "First Moment of Truth device", "FMOT device", "wireless end device" or "WED" as used herein mean a handheld or small portable electronic device that operates wirelessly through a communication multi-network herein; such device being capable of scanning readable media on items for purchase and/or communicating the presumed location of a shopper using the FMOT device.

The term "product scanning device" as used herein means a device capable of scanning readable media like barcodes, UPC codes and other machine readable symbols and codes and includes but is not limited to imagers capable of taking photographs. Product scanning devices produce product scanning data among other types of data disclosed herein. Whenever the phrase "scanned a product" or "product is selected and then scanned" or a similar phraseology referring to the scanning of a product is used, it is meant herein that the barcode or readable medium of the product is being scanned. The preferred product scanning device herein is a FMOT device.

The terms "barcode", "UPC code" and "readable medium" as used herein mean any machine readable code by a product scanning device (e.g., FMOT device) disclosed herein.

By the term "data collection device" it is meant herein, one or more electronic devices comprising a switch and a server grade computer with ample memory for the storage of large quantities of data. The data collection device is capable of performing the functions of a switch, gateway server, store computers, including an associate task managing server, a computer assisted ordering system computer, a point of sale terminal, an in store processor (ISP server), a location tracking server, a commerce server or other logic engine useful for the processing and/or storage of data including, but not limited to, all of the data-related functions described herein.

The term "presumed location" as used herein means the estimated location of the shopper or associate as tracked through one or more electronic devices, e.g., a First Moment of Truth device in relation to known product locations. Shoppers' locations are presumed because the store tracks the location of a location tracking device preferably held within a FMOT device herein and which is held in close proximity to shoppers.

FIGS. 1A through 1D depict a shopper's product selection process of purchasable items from an end cap 22 during the shopper's First Moment of Truth in the store. While these figures depict the end cap, the process may be used for a kiosk, a display, or any other grouping of products that are not placed on one or more standard store shelves. FIGS. 1A-1D are meant to capture, pictorially, the experience had by the shopper at the First Moment of Truth in the store. FIG. 1A shows the shopper just as she approaches end cap 22 in store 5.

Shopper 7, in FIGS. 1A-1D, is shown to possess a FMOT device 50, which is discussed in greater detail below in the description of FIG. 4. Present, but not fully shown in FIGS. 1A-1D is a location tracking subsystem operating between a data collection device and FMOT device 50 through an in-store communications multi-network described more fully hereinbelow. In practice, FMOT device 50 transmits and receives data through one or more information routers 12. In real time herein, data collection device 23 (FIGS. 5, 7A & 9) and store communications multi-network 10 (FIGS. 5 & 9) knows or can know a shopper's location in store 5 as he moves to, stops in front of and then later leaves end cap 22. While shopping, shopper 7's presumed locations are tracked as he maneuvers throughout the store with FMOT device 50.

Figure 1B:
Figure 1C:
Figure 1D:

In FIG. 1A shopper 7 is shown stopped at end cap 22 while he considers his purchasing options. In one example herein, shopper 7 stands before a great array of, for example, laundry detergent options. In FIG. 1B, shopper 7 has selected purchasable item 35 from end cap 22. In FIG. 1C, shopper 7 scans the readable media (not shown) on selected purchasable item 35. At such scanning of purchasable item 35, several important functions occur, each of which will be described in turn.

First, the identity of the scanned purchasable item 35 is transmitted by FMOT device 50 through store communications multi-network 10 such transmissions being received through one or more infatuation routers 12 and ultimately transferred to data collection device 23.

Second, the moment in time of the shopper's product selection is also recorded and stored by data collection device 23. The amount of time that shopper 7 spends deliberating his product selection choice is also known since his travel through the store can be assessed on a moment by moment basis in actual real time. This time can be tracked by either a timing device in the FMOT device 50 or the data collection device 23. This tracked time is referred to herein as product selection timing data.

Third, since the position of shopper 7 in store 5 is known in actual real time, such position is attached to the identity of selected purchasable item 35.

Finally, shopper 7 is shown placing selected purchasable item 35 into the shopping cart as an indication that purchasable item 35 has been actually selected for purchase and not just considered for purchase.

The term "location tracking data" as used herein means the proximate positions of the shopper as she travels throughout the store at select points in time. One specific area of interest may include the proximate positions of the shopper as she experiences a First Moment of Truth, as the location tracking device tracks the FMOT device, which is in close position to the shopper as she maneuvers throughout the store.

From all of the steps noted hereinabove, shopper 7's behavior in store 5 can begin to be assessed. By tracking the entirety of shopper 7's shopping experience including all scanned products therein, her actual real-time shopping behavior in a store can now be tracked, analyzed and potentially influenced once that behavior becomes better understood. Data collection device 23 creates actual real-time shopper behavior data after compiling the product selection timing data, the location tracking data and product scanning data.

Moreover, the system herein tracks the amount of time that shopper 7 spends during a moments of decision for product selection (i.e., the First Moment of Truth) to create product selection timing data. Shopper 7's time of product consideration is tracked, preferably, electronically through either FMOT device 50, data collection device 23, or both. This timing is initiated when the system detects shopper 7 is engaged in a First Moment of Truth.

In practice, the system herein detects shopper 7's engagement during product consideration for selection when it detects that his rate of speed is substantially slower than the shopper's average rate of speed and when the shopper's presumed location in the store is in front of a product display in the store. Part of this detection includes the comparison of the two relative speeds between the time of product consideration for possible purchase and a shopper's typical travel through a store.

Data collection device 23 then acquires and organizes the product scanning data, location tracking data and product selection timing data to create the actual real-time shopper behavior data. In exemplary embodiments, the data collection device 23 collects actual real-time shopper behavior data associated with shopper 7 from two or more shopping trips to store 5 and creates shopper 7 behavior pattern data pertaining to a particular individual shopper. Since data collection device 23 collects data from which shopper behavior data is determined, it can also create shopper demographic data that categorizes entire groups (e.g., women, men, region of the country, behavior during a holiday, etc.).

Going further, data collection device 23 collects and keeps historical progression data, which is the sum total of substantially all of the location tracking data collected from about the time the location tracking device associated with communications multi-network 10 to about the time the shopper 7 checks out and leaves store 5.

Data collection device 23 collects the shopping trip timing data for each shopper for each shopping trip. In alternative embodiments, a timing device collects the shopping trip timing data. The shopping trip timing data means the amount of time the shopper spends in the store from the first moment the shopper's FMOT device 50 associates with communications multi-network 10 in store 5 until the time that the FMOT device disassociates from communications multi-network 10.

Importantly, suppliers of products for purchase for store placement can use the actual real-time shopper behavior data, shopper behavior pattern data and/or the categorical behavior pattern data to determine how to place their products in a store, which products to place in a store, where to geographically place their products, how to best price their products, as well as many other product demographic determinations. Similarly, a store can use the actual real-time shopper behavior data, the shopper behavior pattern data and/or the categorical behavior pattern data to determine what products to place in what stores in what geographic regions, prices for one or more products on display in the store, content for one or more influential messages used to influence shoppers and/or display locations within a store for one or more products supplied by the supplier to the store.

In an exemplary embodiment, data collection device 23 serves as the store's main database, i.e., its main repository of data. Functionally, data collection device 23 organizes, manages and stores data received from other members of the store's communications multi-network 10. Furthermore, data collection device 23 routes data out to other elements of communications multi-network 10, i.e., FMOT device 50 and information routers 12.

In an exemplary embodiment, data collection device 23 has the operability to perform ray tracing calculations and blind node (i.e., FMOT device 50) location calculations to determine its own location in relation to information routers 12 and ultimately its location in store 5. Data collection device 23 produces product selection timing data, shopping trip timing data, and actual real-time shopper behavior data. Data collection device 23 is preferably inside store 5, but because it can encompass more than one physical electronic device, data collection device 23 may be entirely contained within the store premises or it may be located both within and outside of the brick and mortar retail location.

As noted hereinabove, FMOT device 50 is adapted to operate as a location tracking device through communications multi-network 10 for: (1) tracking each of the shopper's presumed locations in a store; and (2) creating location tracking data. Alternatively, a location tracking device in close physical proximity to and in communication with the FMOT device 50 operates through communications multi-network 10 for: (1) tracking each of the shopper's presumed locations in a store; and (2) creating location tracking data.

FIGS. 2A through 2D depict a similar process to that of FIGS. 1A through 1D of product selection by a shopper 7 except that such product selection is occurring along an aisle 24 at a product shelf.

Figure 2A:
FIG. 2A-FIG. 2D provide a depiction of a shopper selecting at least one purchasable item from a store shelf along a store aisle in a store during the shopper's moment of decision.
Figure 2B:
Figure 2C:
Figure 2D:

FIG. 2A shows shopper 7 approaching an aisle 24 on which purchasable item 35 is placed. In FIG. 2B, shopper 7 selects a selected purchasable item 35 from the shelf in the aisle 24. FIG. 2C shows shopper 7 using a FMOT device 50, to scan the identity of the selected product. At such scanning, product scanning data is created and transmitted through the store's communications multi-network to the data collection device where it is collected and organized. Finally, FIG. 2D shows shopper 7 placing the selected purchasable item 35 into the shopper's shopping cart.

Figure 3:
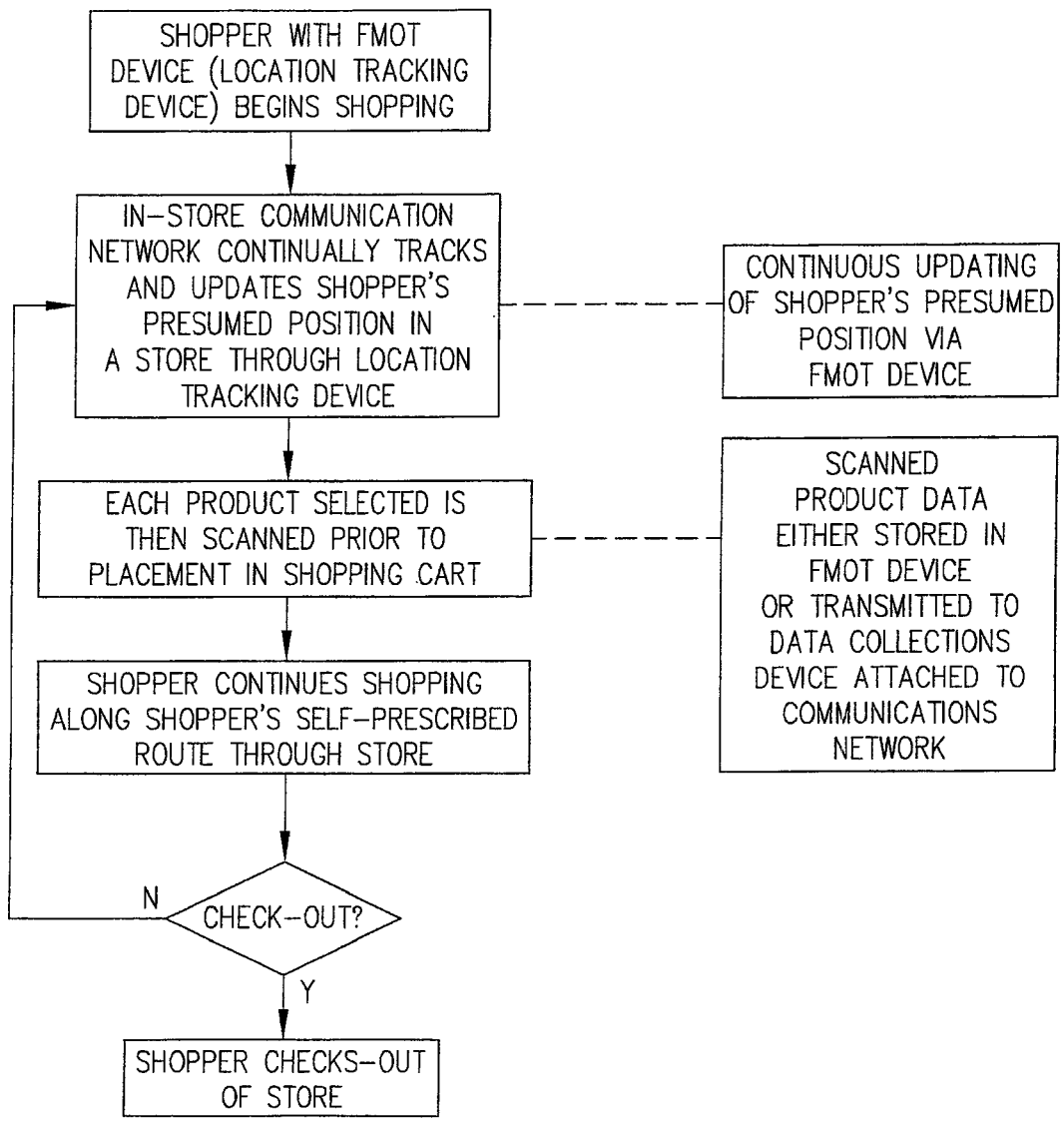
FIG. 3 is a flow diagram that shows a process for a shopper to select products within a store and for communication between a location tracking device, held in proximate position to the shopper as she selects products from the store, and a data collection device; wherein the communication occurs through a communications multi-network in the store.

FIG. 3 provides a flow chart that details the collection of data from a shopper's conduct in a retail environment like store 5. In the first instance, the shopper, armed with the FMOT device 50 that comprises a location tracking device and a product scanning device, begins shopping in the store.

FMOT device 50, when activated, wirelessly associates with in-store communications multi-network 10. Once associated, the communications multi-network continuously tracks and updates each of the presumed locations of shopper 7 in the store through FMOT device 50, which either is preferably adapted to operate as or be associated with a location tracking device.

Alternatively, if not continuously tracked and updated, each of the presumed locations of the shopper is tracked and updated by data collection device 23 for some predetermined interval, e.g., every 5 seconds, every 15 seconds, every 30 seconds, etc. One of ordinary skill in the art will readily understand that a chosen time period of tracking and updating is arbitrary with respect to the exact interval chosen and that such an interval may be chosen by a store manager (or other personnel) in keeping with a corporate directive. So long as a suitable interval of time has been selected according to the needs of store 5, the criteria for the invention herein has been met.

Moving forward in a shopper's shopping process, shopper 7 selects a selected purchasable item 35 for purchase at a location in front of either a store shelf (as shown in FIG. 2A through FIG. 2D) or from a product display that is not a store shelf, such as an end-cap 22 (as shown in FIGS. 1A-1D). Once selected, the shopper scans the barcode of the selected purchasable item 35 selected for purchase. By scanning the barcode at or soon after the moment of selection, shopper 7 registers the identity of the purchasable item 35 selected. By scanning selected purchasable item 35 for purchase at or very near its former place of display, that location is also registered since the shopper's presumed location is known via the location tracking device situated within FMOT device 50. At such scanning, the product's identity may be transmitted through the communications multi-network to a suitable device like a data collection device 23 (FIGS. 5 & 9) attached thereto or the product's identity may be stored in memory onto the FMOT device 50 or both.

As has been noted hereinabove, the shopper's travel through store 5 is being tracked (i.e., preferably continuously or nearly continuously) with the identity of each purchasable item 35 chosen known and its location of selection known. By collection of this data, a shopper's behavior can be gathered in real time and assessed in real time or at a later point, e.g., when a shopper's shopping trip has been concluded.

In exemplary embodiments, once shopper 7 has gathered all of her desired items for purchase she checks out of store 5 in one or more methods of rendering payment including but not limited to paying at a check-out lane, paying the bill through the FMOT device 50, pre-paying the bill online, etc.

Store 5 comprises one or more purchasable items displayed about the store. In exemplary embodiments, each of the one or more purchasable items comprises a barcode. The shopper selects a purchasable item for purchase from the one or more products positioned in the store.

Then, shopper 7 scans the readable media belonging to the purchasable item with the FMOT device 50 to create product scanning data from scanned purchasable item 35. Such product scanning data includes but is not limited to each product's identity (by name and/or internal code) and price. In exemplary embodiments, the product scanning data also includes the identity of the product's manufacturer or supplier to the store. Product scanning data may also include the weight or some similar unit of measurement (volume) of purchasable item 35 selected by the shopper for purchase. Preferably, product scanning data incorporates a date and time stamp for the time of scanning of the readable medium belonging to selected purchasable item 35.

The communications multi-network 10 included in the one or more systems disclosed herein is a communications multi-network, meaning that the communications multi-network 10 comprises two or more similar or dissimilar communications multi-networks 10. For example, communications multi-network comprises at least two mesh communication networks through which each FMOT device 50 operates. An alternative example of the communications multi-network includes a communications multi-network having at least one mesh communication network and at least one star communication network through which a FMOT device 50 herein operates. Also alternatively, the communications multi-network may comprise two or more star communication networks.

In preferred practice herein, communications multi-network 10 includes a "mesh network organizer" which is a radio within the mesh communication network. The mesh network organizer routes information, also known as packets or data, to and from information routers and the central store computer. In one embodiment, the mesh network organizer routes location tracking data to and from information routers and data collection device 23. In one embodiment, the mesh network organizer communicates with the data collection device through an Ethernet cable, while communicating wirelessly through the mesh communication network to the other electronic devices attached to the mesh communication network that include but is not limited to information routers, FMOT device 50, intelligent shopping carts, HVAC monitors and controls, security systems, traffic counters, and other electronic devices that a person with skill in the art foresees attached to the mesh communication network.

Communication between information routers 12 may or may not be wired. Communication between information routers 12 and the mesh network organizer may or may not be wired. Functionally, the mesh network organizer routes location tracking data of the store associate's wireless end devices and the shopper's FMOT device 50 to one or more managers herein. Because the mesh network organizer transmits data through a radio, it broadcasts or radiates out radio waves to other members of the mesh communication network.

By the term "data communication radio," as used herein, means a radio within the star communication network. The data communication radio, as used herein, means a hub node, also known as a central node, of a star communication network. The data communication radio routes data information, also known as packets or data, to and from FMOT devices 50 and data collection device 23. In exemplary embodiments, the data communication radio routes non-tracking data information, e.g. scanning data, to and from the FMOT devices 50 and the data collection device 23. In one embodiment, the data communication radio transmits data through a wire, for example, an Ethernet cable, when communicating with the data collection device, while simultaneously communicating wirelessly through the star communication network to the FMOT devices 50, intelligent shopping carts and/or other blind nodes and electrical devices attached to the star communication network. The data communication radio broadcasts or radiates out radio waves to other members of the star communication network instead of communicating strictly in straight lines.

By the term "information routers" means stationary reference end nodes within the mesh communication network that receive and send information through the mesh communication network to and from the FMOT devices, the mesh network organizer, other information routers and other network devices. Functionally, the information routers communicate with other information routers and the mesh network organizer wirelessly or through wires. In exemplary embodiments, the information routers communicate with the data collection device through the mesh network organizer. Each information router comprises at least one radio. Examples include, but are not Limited to, the following: Texas Instruments Models 2430 and 2431.

The term "multi-network router" means, herein, a device which houses at least three microcontroller unit (MCU) radios, at least one that functions as an information router for the mesh communication network and at least two that functions as a data communication radio for the star communication network. Two of the at least three radios, may be Texas Instruments Models 2430 or 2431, but the third radio must be a controller with greater power, such as the Texas Instruments Models above the 243x series. Functionally, multi-network routers communicate wirelessly or over wires to other multi-network routers. Ideally, multi-network routers communicate wirelessly to the FMOT devices 50 and other electrical devices used by shoppers, associates and managers within the store and store premises. The multi-network routers communicate with the data collection device through the multi-network organizer.

The term "multi-network organizer" as used herein means a multi-network router equipped with a mesh network organizer instead of an ordinary information router of the mesh communication network. Thus, in the embodiment in which the communications multi-network comprises one star communication network and one mesh communication network, the multi-network organizer operates as both the data communication radio for the star communication network and the mesh network organizer for the mesh communication network present in the communications multi-network. Functionally, the multi-network organizer may communicate wirelessly or over wires to multi-network routers. Ideally, the multi-network organizer communicates through wires, for example an Ethernet cable, to the data collection device, though wireless communication is possible.

In some embodiments of the system, the data collection device correlates the product location map with the actual real-time shopper behavior data. The correlation is extremely valuable data that may be used by the store and suppliers alike to better influence shoppers at the First Moment of Truth. With improved ways to influence shoppers, their product selections become increasingly predictable, which is, of course, beneficial to the business models of both stores and suppliers.

Figure 4:
FIG. 4 shows the front surface of a First Moment of Truth device (i.e., wireless end device) used by a shopper in the store to communicate with a data collection device.

FIG. 4 shows an exemplary FMOT device 50 for use herein. In particular, FIG. 4 provides a frontal view of the front surface of the FMOT device with multiple interface keys. The FMOT device 50 herein is preferably battery powered and is also preferably rechargeable. It has the ability to seek out and associate itself (i.e., attach itself wirelessly) to an existing communications multi-network herein. The FMOT device 50 herein may either be a reduced function device or a full function device. Preferably, the FMOT device 50 comprises a scanner 25 (not shown) useful for scanning items by shopper 7 for placement of one or more scanned items into a shopping cart. Herein, the FMOT device 50 acts as a blind node within an existing communications multi-network.

The exemplary FMOT device 50 contains a location engine powered by one or more microcontroller units (MCUs). An exemplary embodiment of the MCU is the Texas Instruments MCU model number CC2431. The CC2431 MCU is programmed with certain algorithms, for example, ray tracing calculations that use inputs from FMOT device 50 to determine its position. The location algorithm used in the CC2431 location engine is based on received signal strength indicator (RSSI) values. The RSSI value will decrease when the distance increases.

Figure 5:
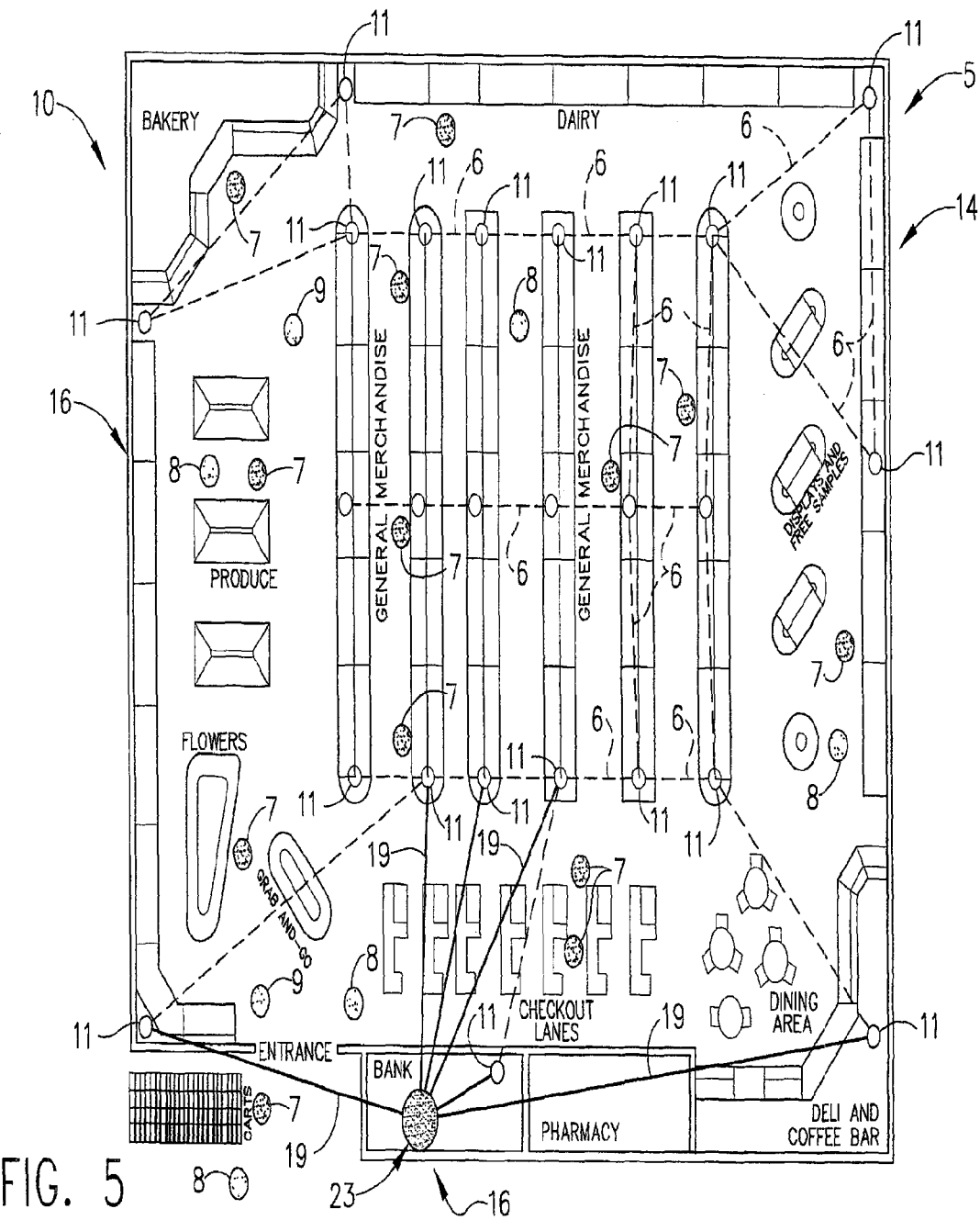
FIG. 5 is a schematic plan view of a store having an exemplary store-based multi-network for communication.

FIG. 5 provides an exemplary schematic plan view of a store 5. In particular, FIG. 5 shows a top view of a section of the store in which shoppers 7, associates 8 and managers 9 are positioned and associated within a communications multi-network 10 for wireless communication between members of the communications multi-network 10.

In exemplary embodiments, the communications multi-network is positioned within and about the store. In exemplary embodiments, a two-dimensional X and Y grid or a three-dimensional X, Y and Z grid is superimposed over a map of the store. In these embodiments, every device on the communications multi-network that is stationary, is assigned and is made aware of its positional coordinates on the grid.

FIG. 5 shows an exemplary embodiment of the communications multi-network, wherein the communications multi-network comprises one or more mesh communication networks 14 and one or more star communication networks 16. For greatest clarity, FIG. 5 shows multiple multi-network routers 11, which operate for both the one or more mesh communication networks and the one or more star communication networks. Thus, each multi-network router preferably contains the components for transmission of data through the one or more mesh communication networks and one or more star communication networks. In exemplary embodiments, the shoppers, associates, and managers are each connected through multi-network communication lines 6 and multi-network routers to both the one or more mesh communication network and the one or more star communication networks 16 of communications multi-network 10.

Figure 6A:
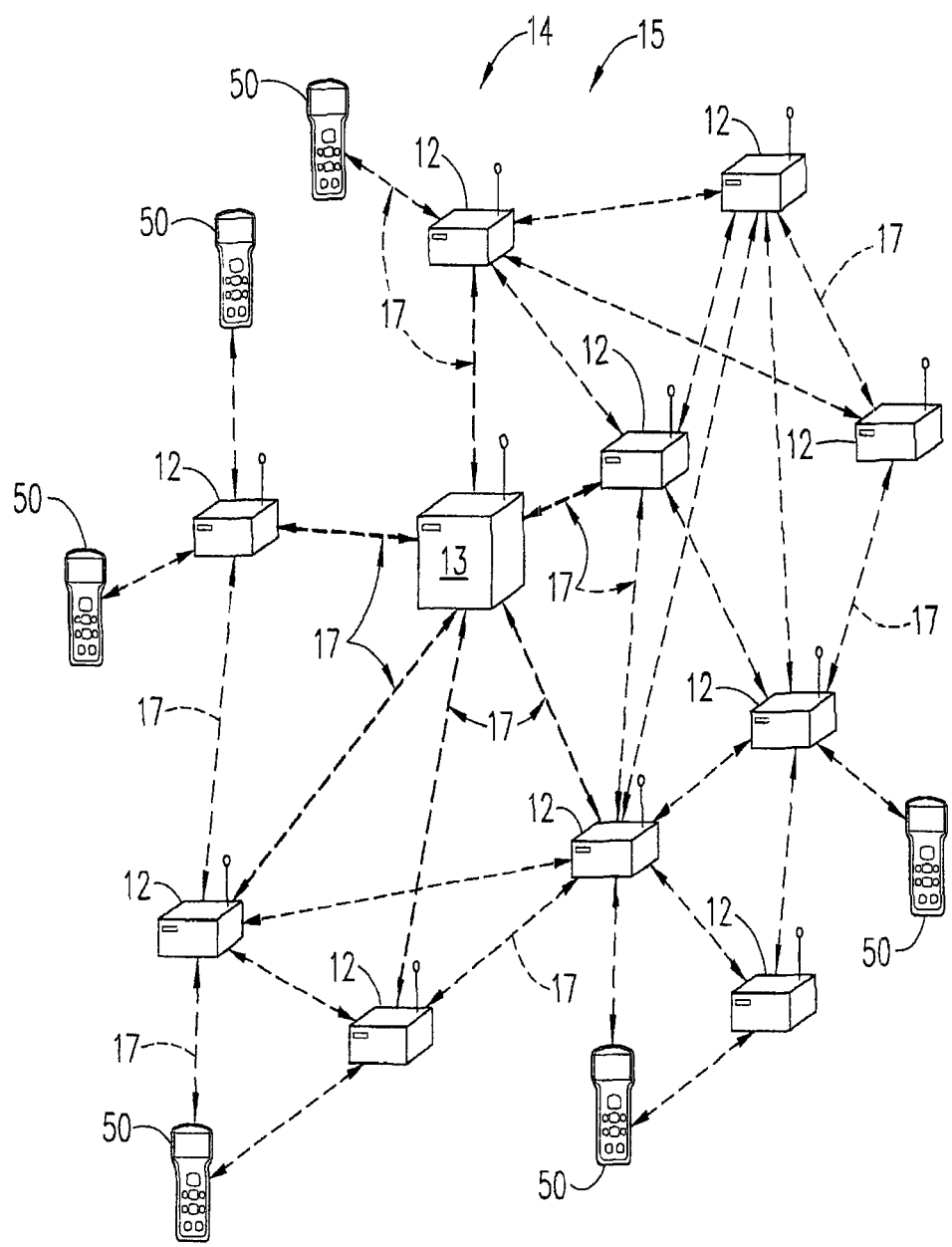
FIG. 6A and FIG. 6B provide a schematic view of an exemplary mesh communication network useful in a store to collect actual real-time shopper behavior data.
Figure 6B:
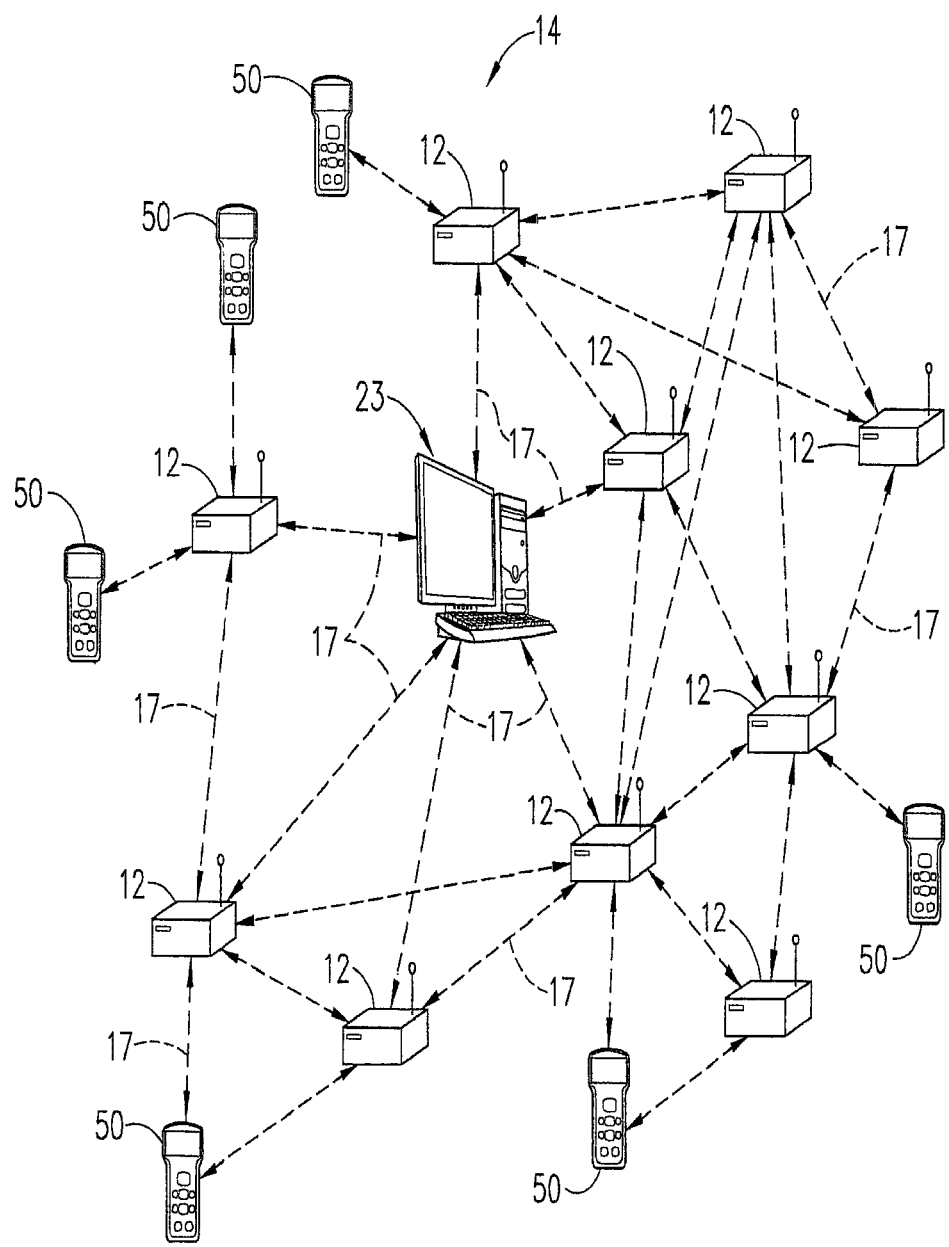

In exemplary embodiments, each multi-network router is placed in a location that is out of reach of the shoppers shopping in the store. An exemplary area of placement for each multi-network router is close to or in the ceiling of the store. Preferably, though not necessarily, each multi-network router 11 houses at least three radios: a first radio functioning as the information router 12 (as shown in FIGS. 6A, 6B, and 9) of the one or more mesh communication networks 14, and at least two more radios functioning as the data communication radio 20 (as shown in FIGS. 7A, 7B, 8 & 9) of the one or more star communication networks 16.

In FIG. 5, system communication lines 19 are shown connecting each multi-network router 11 to the one or more data collection devices 23. System communication lines 19 may be either wireless or wired. Preferably, system communication lines 19 are wired and are shown with solid lines to indicate that they are wired in FIGS. 5. Ethernet cable is the exemplary wired connection device between each multi-network router 11 and one or more data collection devices 23. Exemplary system communication lines for use herein are those of the type suitable for use within an Ethernet physical layer operating within the IEEE 802.3 communications standard. An exemplary Ethernet cable is the "twisted pair": RJ45 and CAT-x copper type. Such cable is designed to facilitate digital transmission of voice and data over copper wiring with high quality and at high speeds.

Also shown in FIG. 5 are multi-network communication lines 6 that correspond to zones of transmission between multi-network router 11 within mesh communication network 14. In practice, the multi-network communication lines, though represented as straight lines for purposes of illustration, are not necessarily straight lines, but more accurately are circular zones of transmission emanating from each multi-network router. The multi-network communication lines are also shown between multi-network routers and shoppers, associates and managers. Although not shown, multi-network communication lines also connect: (1) managers to other managers, associates shoppers and vendors; (2) associates to managers, other associates, shoppers and vendors; (3) shoppers to associates and managers, but preferably do not connect shoppers to other shoppers; and (4) vendors to associates and managers. Through the multi-network communication lines 6 of each multi-network router, actual real-time shopper behavior data is transmitted and received from the wireless end devices and/or the intelligent shopping carts used by shoppers as they shop and/or move about the store.

Preferably each multi-network router 11 operates for both the one or more mesh communication networks 14 and the one or more star communication networks 16. The multi-network router comprises at least three microcontroller units (MCUs). One MCU is used for the one or more mesh communication network and at least two are used for the one or more star communication networks. Each MCU is preferably a system-on-a-chip type of MCU and comprises a control unit, one or more registers, an amount of ROM, an amount of RAM and an arithmetic logic unit (ALU).

The Texas Instruments CC2431 MCU is an exemplary MCU for use as one of the radios for the one or more mesh communication networks 14 and for one of the at least two radios used on the one or more star communication networks 16, because of its ability to readily transmit data through mesh communication network 14 and one or more star communication networks 16 at prescribed data transmission rates. Also, the CC2431 MCU can provide location detection functions within communications multi-network 10 herein. Alternatively, the Texas Instruments CC2430 MCU is an exemplary and exemplary MCU for use as one of the radios for the one or more mesh communication networks 14 and for one of two radios used on the one or more star communication networks 16. The third radio of the at least three radios of the multi-network router 11 is more powerful radio than those of the Texas Instruments CC243x series.

In practice, the data transmission rate within the mesh communication network 14 is preferably configured to be at least 125 kilobytes per second (KB/s). The data transmission rate within one or more star communication networks 16 is preferably configured to be at least 250 KB/s. The interface between the shopper and the communications multi-network 10 is wireless and is accessed by the shopper through the blind node.

FIG. 6A provides a schematic representation of an exemplary mesh communication network 14 for use in the invention herein. Provided herein are the information routers 12 that are in wireless communication along the mesh communication lines 17 with members of the one or more mesh communication networks. Members of the one or more mesh communication networks include blind nodes, weighing devices and one or more mesh network organizers 13.

Mesh communication lines 17 may be wired or wireless. Preferably, mesh communication lines 17 are not actual wired lines. Mesh communication lines 17 are shown in FIG. 6A as dashed to portray the direction and existence of wireless lines of communication between information routers 12 that make up the one or more mesh communication networks 14 and other components like the one or more FMOT device 50 and a mesh network organizer 13. The mesh network organizer is connected along system communication lines 19 (shown in FIGS. 5, 7A, 7B, 8 & 9) to one or more data collection devices 23. The one or more mesh communication networks provide many benefits including low power consumption, low cost of operation, efficient communication within a defined space and low cost for maintenance.

As shown in FIG. 6A, the information routers 12 have the ability to communicate with at least one of the other information routers 12 in the one or more mesh communication networks 14. Preferably, information router 12 is able to communicate with every other mesh network member, for example at least one FMOT device 50.

In exemplary embodiments, the one or more mesh communication networks 14 are a local area network (LAN) that employs one of two connection arrangements. One arrangement is a full mesh topology, while another arrangement is a partial mesh topology. In the full mesh topology, all of the information routers 12 are wirelessly connected to one another and may receive and transmit information to every other information router within the one or more mesh communication networks. In the partial mesh topology, each information router is wirelessly connected to some, but not all, of the information routers available within the one or more mesh communication networks.

Suitable data transfer through the one or more mesh communication networks include location data and non-location information data, such as voice data and digital messages between associate and manager through the one or more mesh communication networks. However, in preferred embodiments, the one or more mesh communication networks are limited to small packets of data, such as the location data, which includes X and Y positional coordinates. Preferably, the location tracking functionality of the communications multi-network 10 is conducted over mesh communication network, while larger packets of data, such as the non-location information data, are communicated through the one or more star communication networks. The information routers 12 do not necessarily communicate with each other, but instead provide location data to each FMOT device 50 and each intelligent shopping cart.

In exemplary embodiments, herein, the location tracking devices associated with the FMOT device 50, calculate their own X and Y positional coordinates through triangulation software or other location tracking software installed onto the blind node. The information routers are aware of their respective X and Y positional coordinates. In exemplary embodiments, the one or more data collection devices 23 inform the information routers of their respective X and Y positional coordinates. The information routers are connected to the mesh network organizer 13 through the communication lines 19 (shown in FIG. 6) to the one or more data collection devices 23 (FIGS. 1 and 2B).

An exemplary embodiment of the mesh communication network 14 used herein is a ZIGBEE network 15. As is shown in FIG. 6A, the ZIGBEE network is formed in part by a mesh of information routers 12 whereby each information router 12 transmits to and receives transmissions from one or more information routers within the ZIGBEE network; i.e., either in a full mesh topology or a partial mesh topology.

The benefits of using ZIGBEE network 15 as the exemplary one or more mesh communication networks 14 herein are several. ZIGBEE networks in a mesh communication network are known for their low power consumption, low cost of implementation, high density of component use (e.g., the use of dozens, if not hundreds, of information routers 12 and/or FMOT device 50 for one mesh communication network), and its simple communications protocol. ZIGBEE networks are intended for use in wireless communication networks requiring low data rates and low power consumption.

In its simplest form, the ZIGBEE network herein comprises one or more information routers 12, at least one mesh network organizer 13, and the one or more FMOT devices 50. The mesh network organizer is a device that routes data through the one or more of information routers within the ZIGBEE network. The mesh network organizer is connected to the one or more data collection devices 23 through the system communications line 19. ZIGBEE network 15 may either be of the non-beacon type or the beacon type.

ZIGBEE network 15 may either be of the non-beacon type or the beacon type. In a non-beacon enabled network (i.e., those whose beacon order is 15), information routers 12 have data receivers that are preferably continuously active. The non-beacon enabled type of ZIGBEE network allows for heterogeneous networks of multiple device types in which some devices receive continuously, while others only transmit when an external stimulus from members of the ZIGBEE network, such as the blind nodes, is detected.

A known example of an element within a heterogeneous network is a lamp having a wireless light switch. The ZIGBEE node at the lamp receives constantly since it is connected to the lamp's power supply while a battery-powered light switch remains "asleep" or inactive until the light switch is thrown. The light switch then activates, sends a command to the lamp, receives an acknowledgment, and returns to a state of inactivation. In a beacon enabled network, information routers within ZIGBEE network transmit periodic beacons to confirm their presence to other network nodes, such as the blind nodes. In an exemplary beacon enabled ZIGBEE network, blind nodes and the information routers power down between beacons, thus lowering their duty cycle and extending battery life when applicable.

In non-beacon enabled networks, power consumption can be higher since at least some of the information routers within communications multi-network are always active, while some others may be inactive. In exemplary embodiments, substantially all of the information routers within communications multi-network are continuously active. To preserve power, a beaconing type of the ZIGBEE network is exemplary for grocery stores.

FIG. 6B provides an exemplary schematic representation of the functionality of the one or more mesh communication networks 14 for use in the invention herein. This FIG. 6B shows that ultimately the one or more mesh communication networks 14 transfer data between the members of the one or more mesh communication networks such as the information routers 12 and the FMOT devices 50 to the one or more data collection devices 23.

Figure 7A:
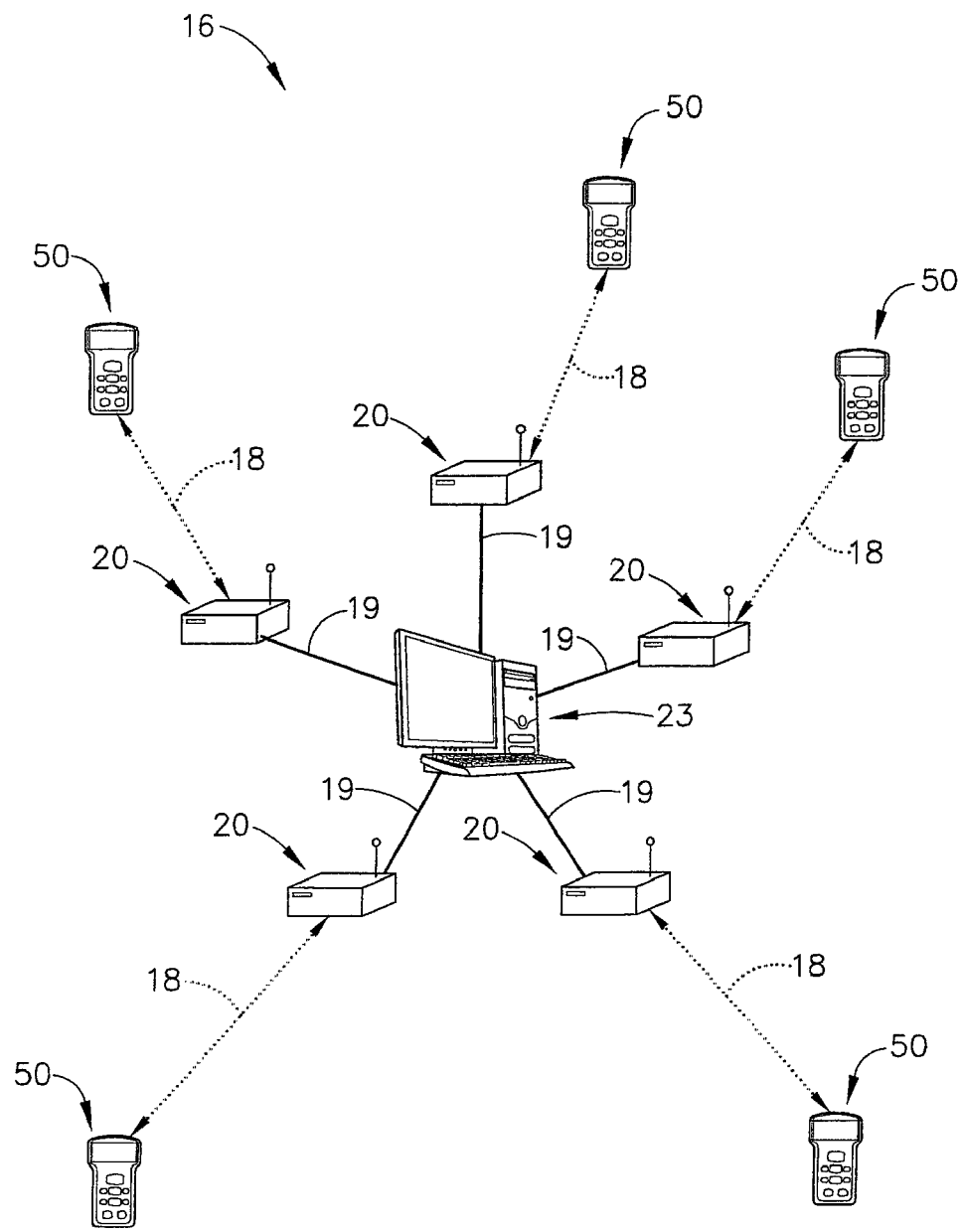
FIG. 7A and FIG. 7B provide a schematic view of an exemplary star communication network useful in a store to collect actual real-time shopper behavior data.

FIG. 7A provides an exemplary representation of the one or more star communication networks 16. Herein, the data communication radios 20, whether housed in their own devices or housed with the information routers 12 in a multi-network router 11 (as shown in FIG. 1), do not communicate directly with one-another but instead communicate directly with the one or more data collection devices 23 along system communication lines 19.

The one or more star communication networks 16 are particularly useful and important to the communications multi-network 10. The one or more star communication networks are the exemplary communication networks of the communications multi-network to carry data streams that require higher data transmission rates for speed and efficiency. Preferably, the one or more star communication networks are used for communicating the non-location information data, such as the voice data, pictures, video, financial transaction data, and other data types best suited for at least 250 KB/s transmission rate in place of or in addition to about 125 KB/s transmission rate provided by the one or more mesh communication networks. However, it is possible to transmit the non-location information data, requiring higher data transmission rates provided by one or more star communication networks, through the one or more mesh communication networks 14.

The exemplary one or more star communication networks herein operate within the Institute of Electrical and Electronics Engineers (IEEE) 802 communications protocol. IEEE 802 refers to a family of IEEE standards dealing with local area networks and metropolitan area networks. More specifically, the IEEE 802 standards are restricted to networks carrying variable-size data packets. In contrast, in cell-based networks, data is transmitted in short, uniformly sized units called cells for use within, for example, cell phones. Though exemplary, it is acknowledged that one or more star communication networks 16 may operate within multiple communication protocols including but not limited to BLUETOOTH (IEEE 802.15.1 and 802.15.2), WIMEDIA (IEEE 802.15.3), WI-FI (IEEE 802.11b), Wi-Fi5 (IEEE 802.11a/HL2) and other wireless protocols like exemplary protocol 802.15.4.

Star communications lines 18 exist between the blind nodes, such as the wireless end device and the intelligent shopping cart used by any of the group of shoppers 7, associates 8, managers 9, and vendor (not shown). The star communication lines also connect the blind nodes with the data communication radios 20, which function as the hub of the one or, more star communication networks 16. The star communication lines may be either wireless or wired. Preferably, the star communication lines are wireless.

Figure 7B:
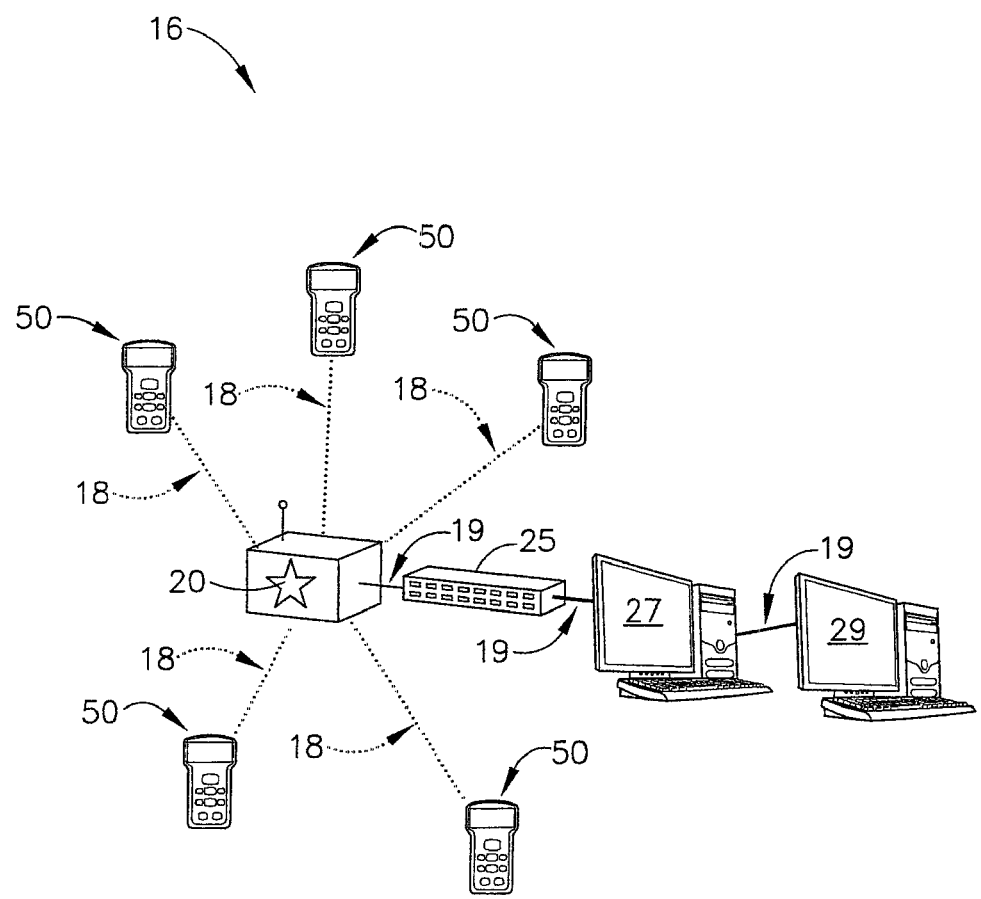

FIG. 7B provides an exemplary representation of the communications multi-network 10. It shows clearly that the information routers 12 of the one or more mesh communication networks 14 provide a signal to FMOT device 50. In FIG. 7B, the information routers provide FMOT device 50 with the X and Y positional coordinates of the information routers. The FMOT device 50 either performs the calculations necessary to provide its own location in the X and Y positional coordinates or it sends a signal out through the one or more star communication networks 16 to the one or more store servers 29, such as the location tracking server, to have the calculations done at that level of the communications multi-network 10. Under either scenario, the location of each FMOT device 50 is known to the one or more data collection devices 23 (shown in FIG. 5) or the location tracking server, through the data exchanged between the FMOT devices 50 and the information routers 12 of the one or more mesh communication networks 14.

In exemplary embodiments, substantially all substantive communication between the FMOT device 50, such as the wireless end devices and intelligent shopping carts, is conducted through the data communication radio 20 and the switch 25 and the gateway server 27 and the appropriate store server 29, which is often the location tracking server.

Figure 8:
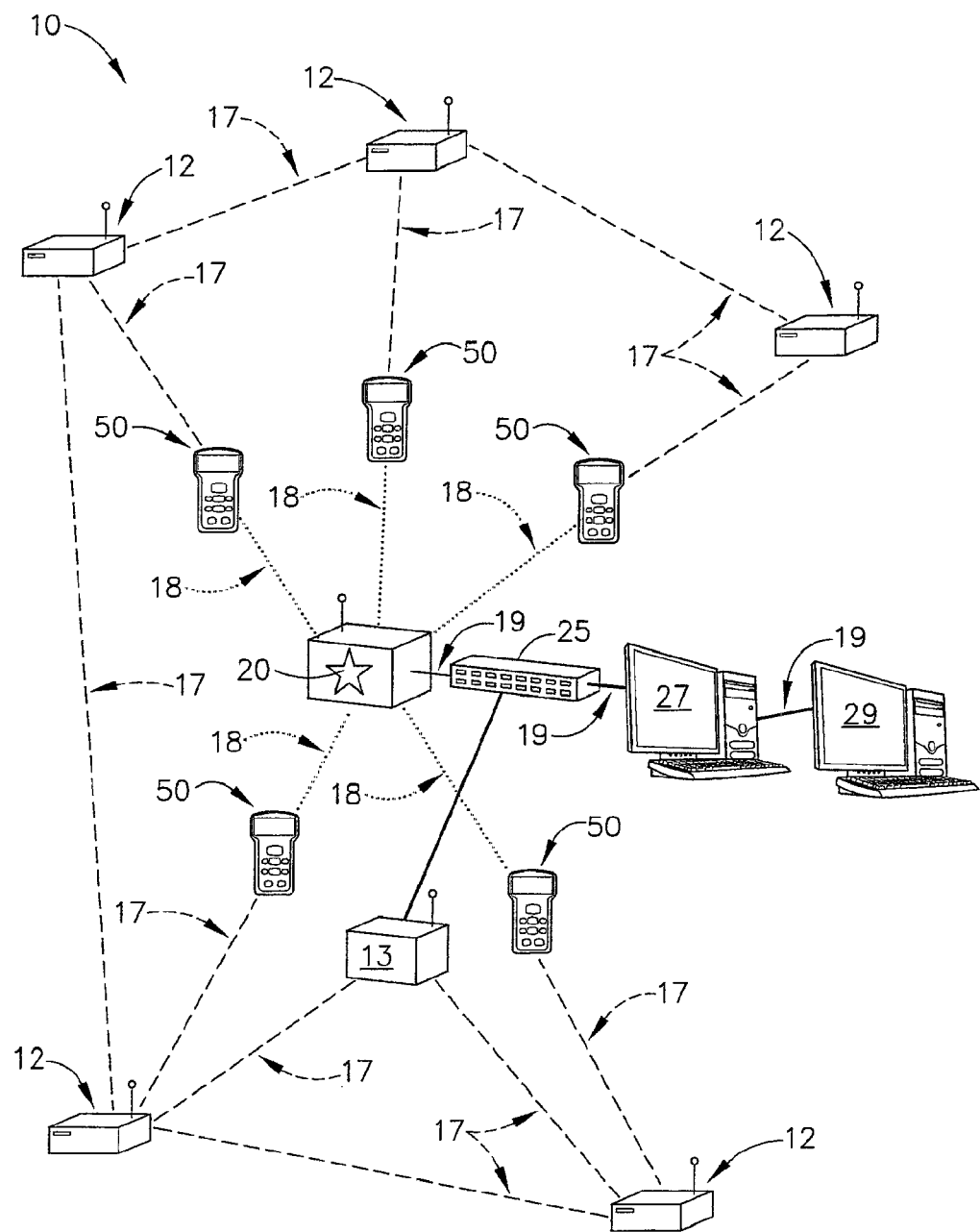
FIG. 8 provides a schematic view of a store providing an exemplary communications multi-network with one star communication network and one mesh communication network useful in a store to collect actual real-time shopper behavior data.
Figure 9:
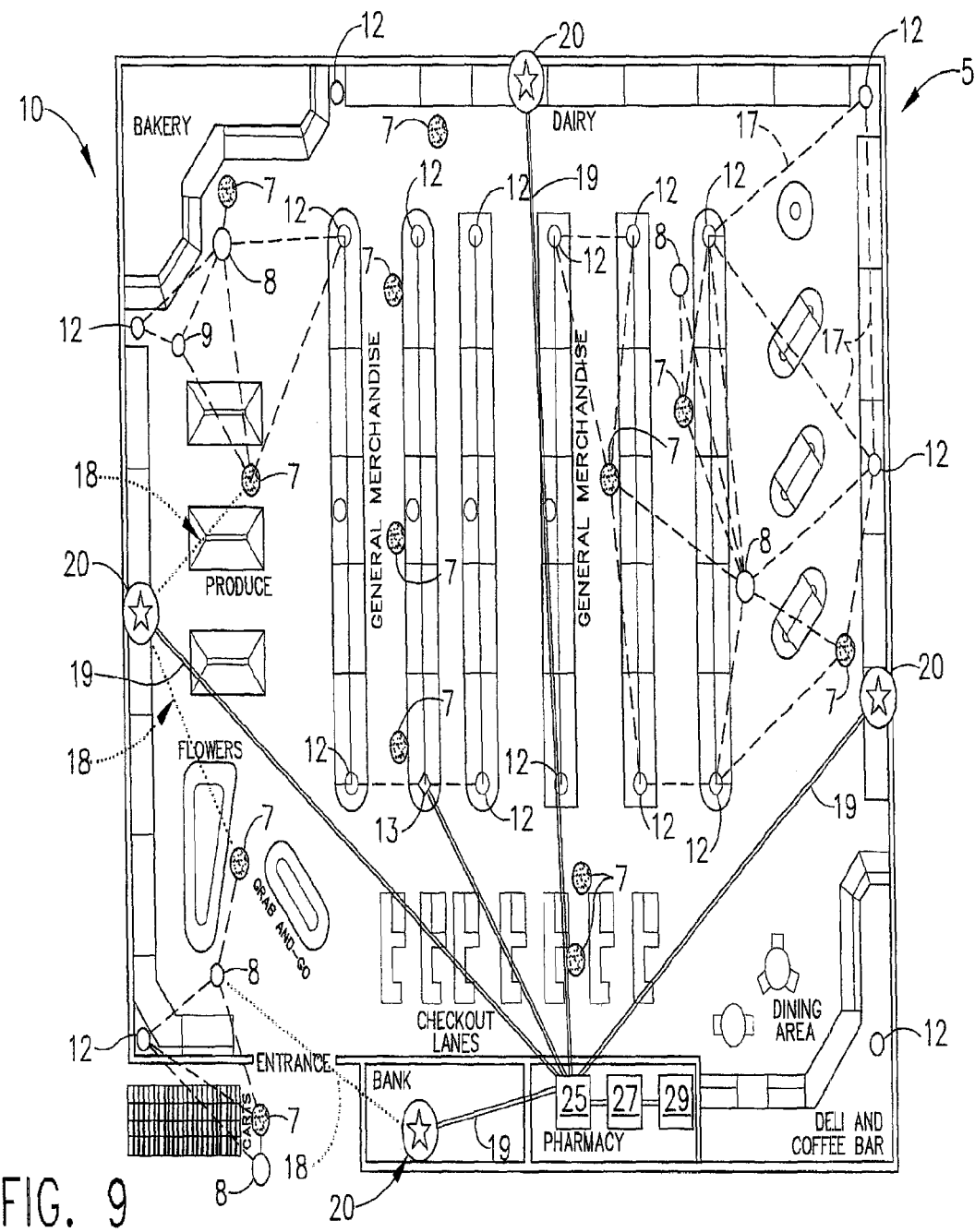
FIG. 9 provides a schematic view of a store providing the exemplary communications multi-network.

FIG. 8 provides an exemplary representation of the communications multi-network 10. It shows clearly that information routers 12 of the one or more mesh communication networks 14 provide a signal to FMOT device 50, which includes the wireless end devices and intelligent shopping carts, wherein as in the exemplary embodiments above, FMOT devices 50 are associated with one or more location tracking devices.

In FIG. 8, the information routers provide the FMOT devices 50 with the X and Y positional coordinates of the information routers. The FMOT devices 50 either perform the calculations necessary to provide their own location in X and Y positional coordinates or they send a signal out through the one or more star communication networks 16 to the one or more store servers, such as the location tracking server. As stated above, both the one or more data collection devices and the location tracking server are capable of performing the ray tracing and location tracking calculations. Under either scenario, the location of each FMOT device 50 is known to one or more of store servers through the data exchanged between FMOT device 50 and the information routers 12 of the one or more mesh communication networks 14. In exemplary embodiments, the location tracking server performs the location tracking computations instead of having the computational work being performed on the FMOT devices 50.

The location tracking computations use information (the X and Y positional coordinates of the nearest information router) provided by FMOT device 50 to the location tracking server. The nearest information router (to the FMOT device 50) receives the X and Y positional coordinates of the FMOT device 50 from the mesh network organizer 13, which receives the X and Y positional coordinates from the location tracking server. In any event, the location of the FMOT device 50 on the map of the store (shown in FIG. 5) is known to both the FMOT device 50 and location tracking server, through the one or more mesh communication networks 14 of communications multi-network 10.

FIG. 9 shows an alternative exemplary embodiment, an exemplary top schematic view of the store with multiple star communication networks 16. Also shown in FIG. 9 is the one or more mesh communication networks in combination with multiple star communication networks. Persons of skill in the art will readily recognize that though FIG. 9 shows multiple star communication networks and one or more mesh communication networks, it is possible that the communications multi-network 10 comprises only multiple star communication networks without the presence of the one or more mesh communication networks.

In FIG. 9, as in FIG. 5, the mesh communication lines 17 are shown connecting each information router 12 to the mesh network organizer 13 within the one or more mesh communication networks 14. In addition, the mesh communication lines exist between the information routers within the mesh communication network. In practice, the line of communication, though represented as straight lines for purposes of illustration, are not necessarily straight lines. Rather, each information router operable within the one or more mesh communication networks produces a limited zone of communication through which intra-communication between information router occurs.

The system communication lines 19 are shown connecting data communication radio 20 and the one or more data collection devices 23. The system communication lines are shown connecting the mesh network organizer 13 with the one or more data collection devices 23. For the communications multi-network 10 that contains the two or more star communication networks 16, each data communication radio shown for each of the one or more star communication networks is connected through system communication lines to the one or more data collection devices 23 that operate as a master network coordinator for substantially all of the members of the communications multi-network.

Figure 10:
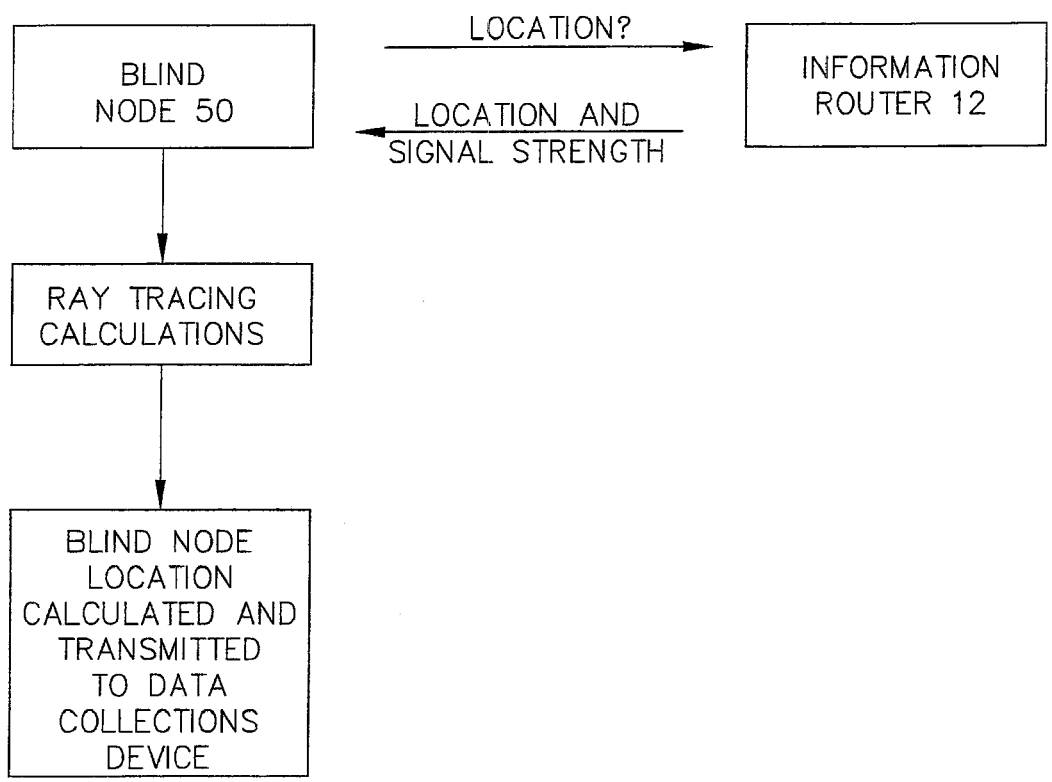
FIG. 10 provides a diagram of an exemplary process by which the location tracking subsystem operates.

FIG. 10 provides a flowchart of an exemplary method for determining in real time the location of a FMOT device 50 within a communications multi-network. In practice, the FMOT device 50 sends a signal that is received by the closest information router 12 within the communications multi-network, which is preferably a ZIGBEE mesh communication network 15 of a communications multi-network 10. The signal sent a FMOT device 50 seeks to establish its location within the store. In return for the sent signal, each information router 12 sends a signal back to FMOT device 50 that indicates its own location. Each received signal from the information router has an attendant signal strength that the FMOT device 50 can measure.

Next, with the signal strengths of each received signal measured and thereby known by the FMOT device 50, the FMOT device 50 preferably uses ray tracing calculations with the signal strengths as inputs to calculate its position with respect to the information routers and thereby calculates its position along an X and Y coordinate system. Once calculated, the FMOT device 50 transmits its set of X and Y positional coordinates through the network to the one or more data collection devices that can then store and keep track of the FMOT device's various locations throughout the store.

Ideally, the one or more data collection devices or a location tracking server (not shown) keeps track of every FMOT device 50 within the store and thereby regulates and controls operation of the one or more methods herein. Also ideally, the location tracking subsystem operates continuously or substantially continuously for tracking the location of each FMOT device 50 during the time of its operation within the store equipped with a communications multi-network herein. Thus, the process described hereinabove for FIG. 10 preferably occurs substantially continuously such that the location of any given FMOT device 50 within the store may be calculated and thereby known moment by moment and stored by the one or more data collection devices 23 (FIGS. 5 & 9). Such storage of the FMOT device's position at all or substantially all of its locations within the store builds shopper behavior pattern data, which includes an important history of the FMOT device's presumed locations in the store.

When the location engine portion of a blind node is housed within a FMOT device 50 used by the shopper to scan items within the store for purchase, actual real-time shopper behavior data is gathered by the one or more data collection devices. Gathering of such actual real-time shopper behavior data, which can be stored for later analysis or same-time transmitted to one or more interested parties, (e.g., consumer goods companies), is paramount. To date, companies that sell their wares in retail stores are rarely able to track actual shopper behavior, such as product selection at the point of such selection, but have instead used electronic simulations and imprecise sales data to approximate shoppers' behavior and influences to their spending within the retail store.

With the advent of the disclosed technology, now when a merchandiser requests a retail store to place an end cap 22 of its purchasable items at the end of an aisle for a predetermined amount of time, the retail store can: (1) gauge the shopper traffic around the end cap, (2) determine how long the shoppers remained adjacent to the end cap 22, and (3) identify any and all items the shoppers scanned from the end cap 22 (FIGS. 1A-1D) and placed into their shopping carts and/or subsequently paid for and took home. Such an ability by the inventions herein, therefore, provide insight into actual real-time shopper behavior prior to and at the point of product selection; such behavior being known by the stores at the First Moment of Truth as noted hereinabove. Monitoring and cataloging such actual shopper behavior in real time is a sea change in the nature of such shopper evaluation and analysis. This change is powered by the ability of the inventions herein, i.e., the one or more methods for locating a shopper's presumed location in a store.

Figure 11A:
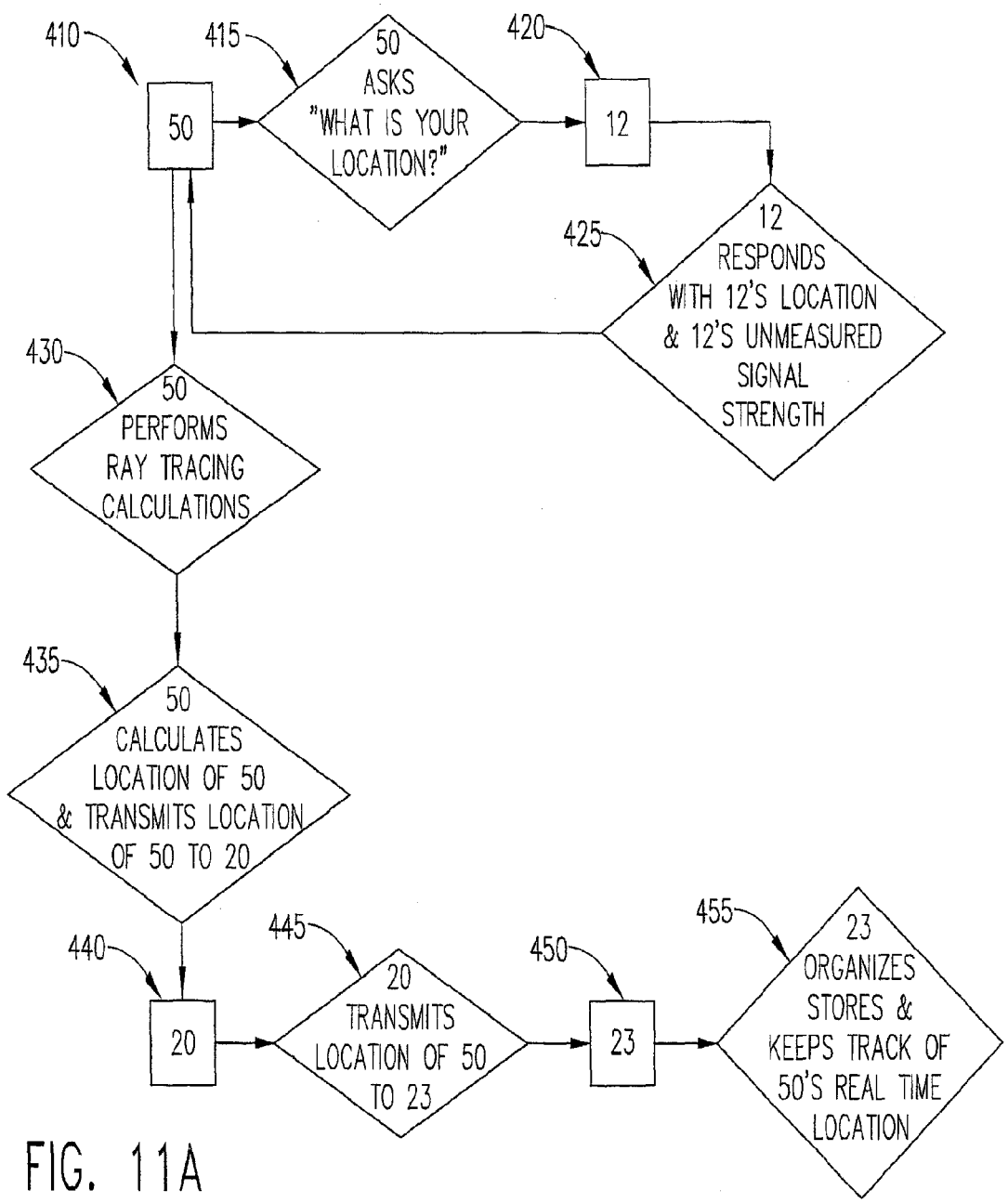
FIG. 11A provides an exemplary embodiment of the location tracking subsystem.

FIGS. 11A-11D provide flowcharts of exemplary location tracking subsystems of the disclosed invention. In FIG. 11A, the FMOT device 50 (the blind node) asks all of the information routers 12 within its range of transmission for their locations. Each of the information routers 12 within range will send its location coordinates to the FMOT device 50. At least two information routers 12 transmit their location information to FMOT device 50. The location information belonging to the information routers 12 is in terms of X and Y coordinates superimposed over a map of the store, longitude and latitude coordinates, or other location data known to persons of ordinary skill in the art.

FIG. 11A provides an exemplary non-beaconing communications multi-network as shown in steps 410 through step 425, where it is the blind node 50 (e.g. the FMOT device) at step 410 that initiates contact with the information routers 12, shown in step 420. As shown in step 415, the FMOT device 50 asks the information routers 12 shown in step 420, an exemplary question "what is your location?", but a person with skill in the art contemplates other forms of communication with information routers 12.

Figure 11B:
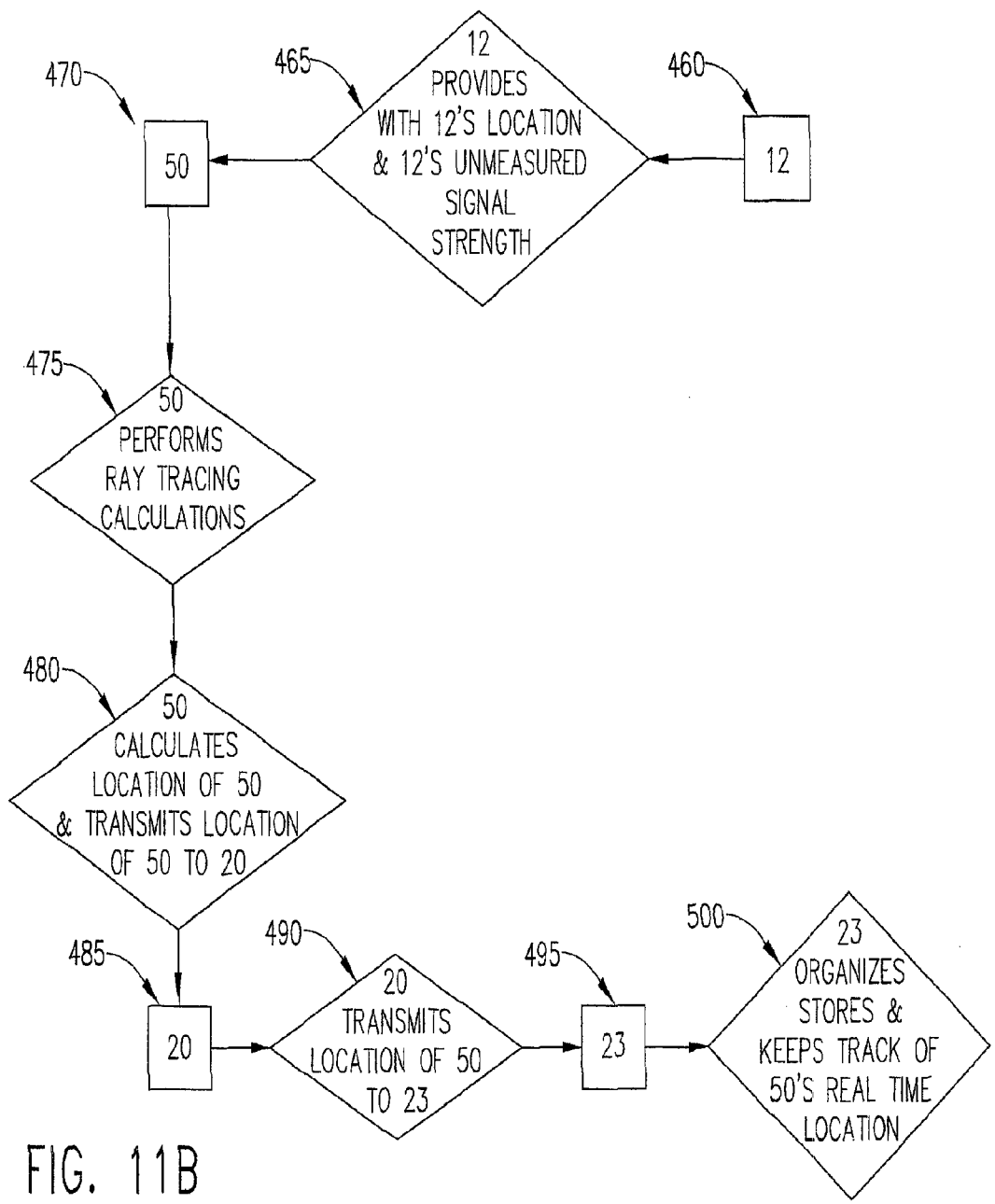
FIG. 11B provides an exemplary embodiment of the location tracking subsystem.

In contrast, FIG. 11B provides an exemplary beaconing mesh communication network as shown in steps 460 to 470, where it is the information router 12 that periodically and rhythmically sends out signals to whatever devices that may be listening, which in this case is the blind node 50. Other than this difference, the location tracking subsystems of FIGS. 11A and 11B are the same.

In FIG. 11A, the ray tracing calculations shown herein performed in step 430 necessary to determine the real time location information pertaining to the FMOT device 50 are performed by the FMOT device 50 shown in step 410. In step 435, the FMOT device 50 then transmits the location information pertaining to the FMOT device 50 to the data communication radio 20, shown in step 440, which in turn provides in step 445 the location information to the one or more data collection devices 23 shown in step 450. In exemplary embodiments, location information is routed through the mesh communication network, while non-location data is routed through the star communication network of the communications multi-network. In step 455, the data collection device 23 organizes, stores and keeps track of the FMOT device's location in real-time. The data collections device 23 receives and sorts location information.

In FIG. 11B, in step 475 the FMOT device performs the ray tracing calculations to determine the real time location information pertaining to the FMOT device 50. In step 480, the FMOT device 50 then transmits the location information to the data communication radio 20, shown in step 485, which in turn provides in step 490 the location information to the one or more data collection devices 23 shown in step 495. In exemplary embodiments, such location information is routed through the mesh communication network. In step 500, the data collection device 23 organizes, stores and keeps track of the FMOT device's location in real time. The data collections device 23 receives and sorts location information.

Figure 11C:
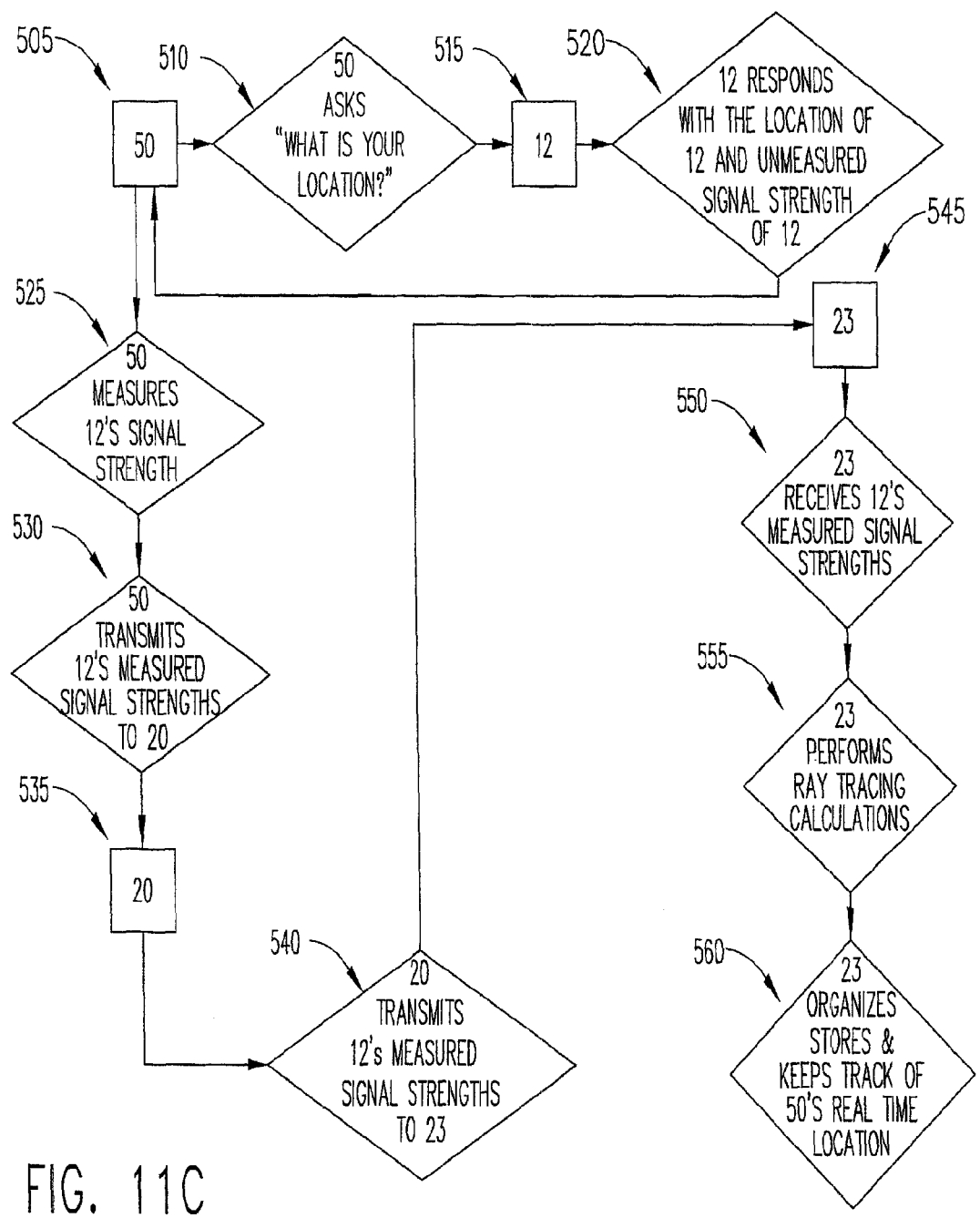
FIG. 11C provides an exemplary embodiment of the location tracking subsystem.
Figure 11D:
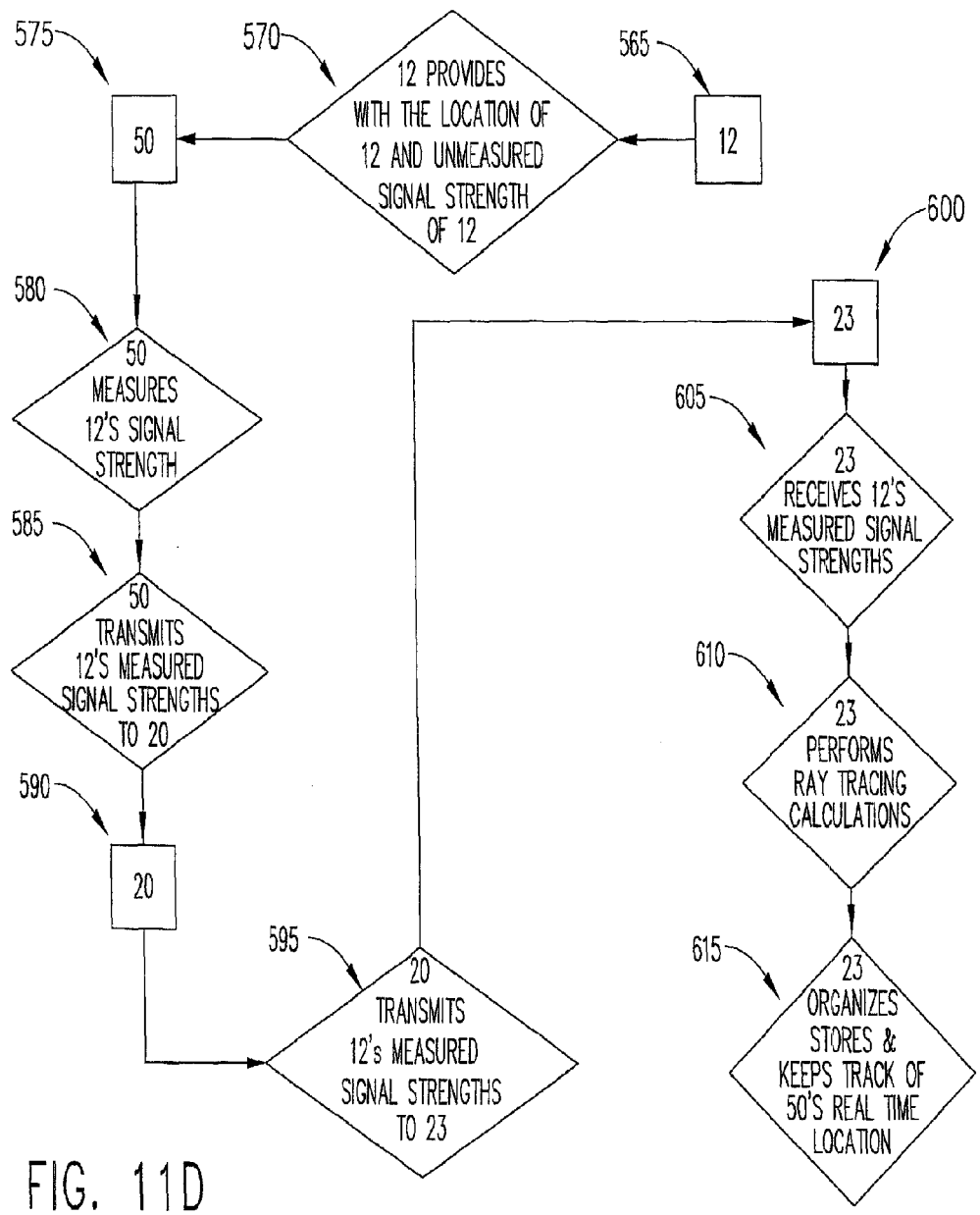
FIG. 11D provides an exemplary embodiment of the location tracking subsystem.

FIG. 11C provides one or more exemplary methods of determining the location of FMOT device 50, shown in step 505, within the communications multi-network 10. In FIGS. 10, 11A and 11B, the FMOT device 50, operating as a blind node, conducts the ray tracing calculations thus calculating its own X and Y coordinates within a store. In FIGS. 11C and 11D, the blind node still measures the strength of the signals received from available information routers 12, but once the blind node has measured the strength of the signals received from the information router 12, it transmits those measured signal strengths through the communications multi-network to a data communication radio 20, which in turn transmits the measured signal strengths to the one or more data collection devices 23. Then, the data collection device performs ray tracing calculations using the measured signal strengths as inputs into the relevant ray tracing calculations. The output of such calculations is the location presented in a set of X and Y positional coordinates of the blind node that measured the signal strengths.

FIG. 11C provides an exemplary non-beaconing communications multi-network as shown in steps 505 through step 520, where it is the blind node 50, shown in step 505, which initiates contact, shown in step 510, with the information routers 12, shown in step 515. As shown in step 415, the FMOT device 50 asks the information routers 12, shown in step 420, an exemplary question "what is your location?", but a person with skill in the art contemplates other forms of communication with information routers 12. In contrast, FIG. 11D provides an exemplary beaconing mesh communication network, as shown in steps 565 to 575, where it is. The information router 12, shown in step 565, that periodically and rhythmically sends out signals, shown in step 570, to whatever devices that may be listening, which in FIG. 11D is the FMOT device 50, shown in step 575. Other than this difference, the location tracking subsystems of FIGS. 11C and 11D are the same.

In FIG. 11C, in step 525 the FMOT device 50 measures the signal strength of the information routers 12. Then, in step 530, the FMOT device transmits the measured signal strengths of the information routers 12 to the data communication radio 20, shown in step 535. In step 540, the data communication radio 20 transmits the measured signal strengths of the information routers 12 to one or more data collection devices 23, shown in step 545. In step 550, the one or more data collection devices 23 receives the measured signal strengths of the information routers 12. In step 555, the one or more data collection devices 23 performs ray tracking calculations. In step 560, the one or more data collection devices 23 organizes, stores and keeps track of the FMOT device's location in real time.

FIG. 11D in step 580, the FMOT device 50 of step 575 measures the signal strength of the information routers 12 shown in step 565. Then, in step 585, the FMOT device transmits the measured signal strengths of the information routers 12 to the data communication radio 20, shown in step 590. In step 595, the data communication radio 20 transmits the measured signal strengths of the information routers 12 to one or more data collection devices 23, shown in step 600. In step 605, the one or more data collection devices 23 receives the measured signal strengths of the information routers 12. In step 610, the one or more data collection devices 23 performs ray tracing calculations. In step 615, the one or more data collection devices 23 organizes, stores and keeps track of the FMOT device's location in real time.

Other exemplary embodiments of the location tracking subsystem, not shown, include the above exemplary subsystems of FIGS. 11A, 11B, 11C and 11D, wherein each information router 12 and each data communication radio 20 is replaced with a multi-network router 11 as shown in the exemplary communications multi-network of FIG. 5.

Figure 12:
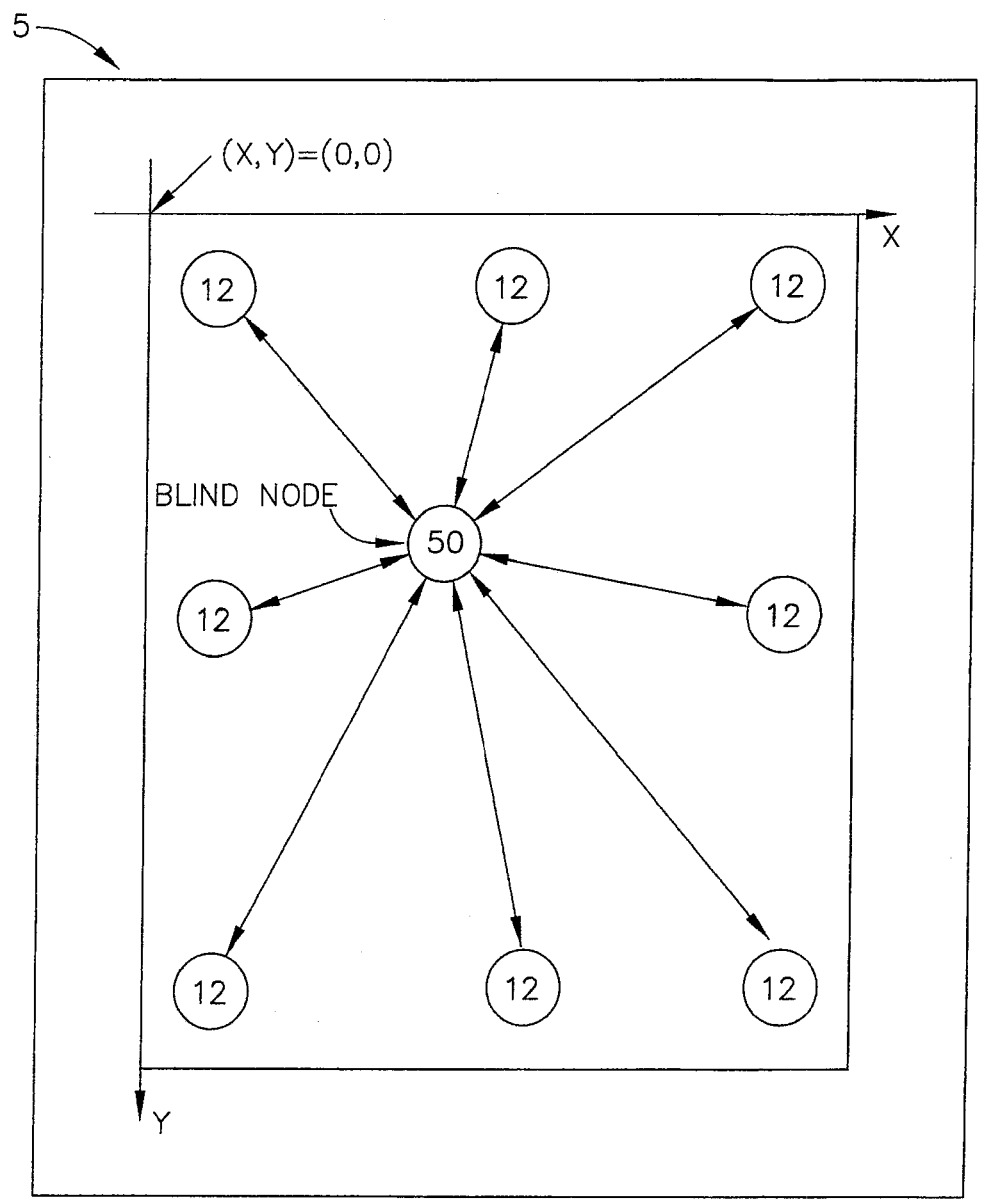
FIG. 12 shows a simplified schematic for the location tracking subsystem.

FIG. 12 shows a simplified schematic of the location tracking subsystem for location detection. Each information router 12 is a static (i.e., unmoving) node placed at a known position within store 5 and remains stationary. For simplicity, each information routers 12 knows its own position and can tell other nodes or other components within the schematic where it is on request by transmissions of a signal.

An information router 12 can operate on various types of MCUs. For example, suitable MCUs from Texas Instruments are model numbers CC2430, CC2431 and or CC2420.

In exemplary embodiments, when the blind node 50 herein receives a data packet containing X and Y coordinates from each information router 12 in range, the FMOT device 50 automatically adds an RSSI value to the received packet. The RSSI value is preferably averaged over the 8 first symbol periods (128 μs). In an exemplary embodiment, this RSSI value is represented as a one byte value, as a signed 2's complement value. When a packet is read from the FIFO on the CC2431, the second last byte will contain the RSSI value that was measured after receiving 8 symbols of the actual packet. Even if the RSSI value is captured at the same time as the data packet is received, the RSSI value will reflect the intensity of received signal strength at that time or possibly also the signal power belonging to the received data.

Blind node 50 (e.g. the FMOT device) herein may preferably contain a register termed RSSI. This register holds the same values as described above, but it is not locked when a packet is received, hence the register value should not be used for further calculations. Only the locked RSSI value attached to the received data can be interpreted as the RSSI value measured exactly when the data is received.

The received signal strength is a function of the transmitted power and the distance between the sender and the receiver. In exemplary embodiments of the systems, the received signal strength decreases with increased distance as the equation below shows:

$$(lo \log)10 RSSI = -nd + A$$

Wherein, n is a signal propagation constant, also named propagation exponent; d is a distance from sender; and A is a received signal strength at a distance of one meter.

If too few information routers 12 are used, then the influence from each of each information router becomes higher, and one erroneous RSSI value can change the calculated position in a significant way. Erroneous RSSI values in this context means an RSSI value that does not fit well with the theoretical value, e.g., due to multi-path or if the signal is blocked by walls or other obstructions. Thus, it is advantageous to include a multitude of information routers within an environment, such as a retail environment store.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of acquiring actual real-time shopper behavior data approximate to a period of product selection by a shopper in a store filled with one or more purchasable items, comprising:
providing a First Moment of Truth device to said shopper, said First Moment of Truth device comprising a location tracking device;
providing a communications multi-network about said store, said First Moment of Truth device being communicatively coupled to said communications multinetwork, said communications multi-network comprising:
at least one data collection device configured to receive and store said actual real-time shopper behavior data;
at least one mesh communication network for the transfer of location tracking data between said location tracking device and said data collection device; and
at least one star communication network for the transfer of said actual real-time shopper behavior data between said First Moment of Truth device and said data collection device;
collecting said actual real-time shopper behavior data using said First Moment of Truth device;
transferring said actual real-time shopper behavior data through said star communication network of said communications multi-network to said data collection device;
creating location tracking data using said location tracking device of said First Moment of Truth device;
transferring said location tracking data through said mesh communication network of said communications multi-network to said data collection device; and
storing in said data collection device said actual real-time shopper behavior data and historical progression data, said historical progression data comprising substantially all said location tracking data created by said location tracking device of said First Moment of Truth device, wherein when a presumed location of said shopper is not continuously tracked and updated using said location tracking device, said presumed location of said shopper is updated by said data collection device for a predetermined interval of time.

2. The method of claim 1 wherein said actual real-time shopper behavior data comprises an identity of one or more purchasable items chosen for purchase by said shopper.

3. The method of claim 1 wherein said actual real-time shopper behavior data comprises an identity of one or more purchasable items not chosen for purchase by said shopper.

4. The method of claim 1 wherein said actual real-time shopper behavior data comprises an amount of time taken by said shopper to choose one or more purchasable items.

5. The method of claim 1 further comprising:
associating electronically said First Moment of Truth device with said communications multi-network; and
dissociating electronically said First Moment of Truth device from said communications multi-network,
wherein said creating location tracking data using said location tracking device occurs between said associating and said dissociating.

6. The method of claim 1 wherein said data collection device acquires and organizes the actual real-time shopper behavior data.

7. The method of claim 1 further comprising transmitting one or more influencing messages to said First Moment of Truth device, wherein said transmitting one or more influencing messages is conducted by said at least one data collection device.

8. The method of claim 7 further comprising tracking a response or nonresponse of said shopper as a result of one or more influencing messages, wherein said tracking is conducted by said First Moment of Truth device and wherein said actual real-time shopper behavior data further comprises said shopper's response or nonresponse to said one or more influencing messages.

9. The method of claim 1 further comprising:
configuring said First Moment of Truth device to function as a product scanning device and to transmit said product scanning data;
scanning a readable medium located on said one or more purchasable items;
generating product scanning data when said readable medium located on said one or more purchasable items is scanned by said First Moment of Truth Device; and
transmitting said product scanning data from said First Moment of Truth device through said communications multi-network to said data collection device for analysis in real time.

10. The method of claim 9 wherein said actual real-time shopper behavior data comprises a shopper's identification data, said location tracking data, and said product scanning data.

11. The method of claim 9 wherein said First Moment of Truth device records a moment in time corresponding to when said First Moment of Truth device creates said product scanning, said First Moment of Truth device creating product scanning timing data from said recording.

12. The method of claim 11 further comprising:
recording a moment in time when said location tracking data is created, said recording being conducted by said First Moment of Truth device to create location tracking timing data;
transmitting said location tracking timing data to said data collection device;
identifying a match between said product scanning timing data, corresponding to when said data collection device receives the product scanning data, and said location tracking timing data, corresponding with said moment in time when said location tracking data is created to identify a match; and
associating said product scanning data with said location tracking data when a match is identified.

13. The method of claim 9 wherein said data collection device records a moment in time corresponding to when it receives the product scanning data from the First Moment of Truth Device.

14. The method of claim 13 further comprising:
recording a moment in time when said location tracking data is created, said recording being conducted -by said data collection device;
identifying a match between said moment in time corresponding to when said data collection device receives the product scanning data and said moment in time when said location tracking data is created to identify a match; and
associating said product scanning data with said location tracking data when a match is identified.

15. The method of claim 1 further comprising:
providing a timing device associated with said data collection device;
calculating a shopper's average rate of travel in said store based on a shopping trip timing data of at least a shopper's first shopping trip and a shopper's location tracking data of at least a shopper's first shopping trip, said shopping trip timing data being an amount of time between when said First Moment of Truth device electronically associates with said communications multi-network and when said First Moment of Truth device electronically dissociates with said communications multi-network;

calculating and tracking the shopper's actual real-time rate of travel in said store during a shopper's second shopping trip, wherein said calculating and tracking is conducted by said data collection device;

comparing said shopper's actual real-time rate of travel during said shopper's second shopping trip with said shopper's average rate of travel, said comparing being conducted by said data collection device in substantially real-time;

marking a beginning of a period of product selection when said shopper's actual real-time rate of travel is substantially slower than the shopper's average rate of travel based on said comparing, said marking the beginning of the period of product selection being conducted by said data collection device;

concluding said period of product selection when a product scanning data is created by scanning said one or more purchasable items with said First Moment of Truth device, said concluding said period of product selection being conducted by said data collection device;

calculating a duration of said period of product selection to generate product selection timing data, said calculating conducted by said data collection device; and organizing said product selection timing data with said actual real-time shopper behavior data, wherein said organizing is conducted by said data collection device.

16. The method of claim 15 further comprising transmitting during said period of product selection one or more influencing messages to the First Moment of Truth device through said star communication network in order to influence said shopper's decision.

17. The method of claim 1 further comprising:

providing a timing device associated with said data collection device;

calculating a shopper's average rate of travel in said store based on a shopping trip timing data of at least a shopper's first shopping trip and a shopper's location tracking data of at least a shopper's first shopping trip, said shopping trip timing data being an amount of time between when said First Moment of Truth device electronically associates with said communications multi-network and when said First Moment of Truth device electronically dissociates with said communications multi-network;

calculating and tracking the shopper's actual real-time rate of travel in said store during a shopper's second shopping trip, wherein said calculating and tracking is conducted by said data collection device;

comparing said shopper's actual real-time rate of travel during said shopper's second shopping trip with said shopper's average rate of travel, said comparing being conducted by said data collection device in substantially real-time;

marking a beginning of a period of product selection when said shopper's actual real-time rate of travel is substantially slower than the shopper's average rate of travel based on said comparing and when said location tracking data indicates said shopper is substantially near a product display in said store, said marking the beginning of the period of product selection being conducted by said data collection device;

concluding said period of product selection when said location tracking data indicates that shopper is no longer substantially near said product display;

calculating a duration of said period of product selection to generate product selection timing data, said calculating conducted by said data collection device; and organizing said product selection timing data with said actual real-time shopper behavior data, wherein said organizing is conducted by said data collection device.

18. The method of claim 17 further comprising transmitting during said period of product selection one or more influencing messages to the First Moment of Truth device through said star communication network in order to influence said shopper's decision.

* * * * *

UNITED STATES PATENT AND TRADEMARK OFFICE
CERTIFICATE OF CORRECTION

PATENT NO. : 8,600,828 B2  
APPLICATION NO. : 13/475715  
DATED : December 3, 2013  
INVENTOR(S) : Brett Bracewell Bonner et al.

Page 1 of 1

It is certified that error appears in the above-identified patent and that said Letters Patent is hereby corrected as shown below:

On title page, item (56) References Cited
Please add the following U.S. Patent Document --2009/0207050  08/2009  Arpin et al.--

On title page, item (56) References Cited
Please add the following Foreign Patent Document

--RU  2010134950  02/2012--

On title page, item (56) References Cited
Please add the following Other Publication --Search Report and Documentary Conclusion as issued for Georgian Patent Application No. 11883/01, dated May 3, 2012.--

Signed and Sealed this
Twenty-fifth Day of March, 2014

Michelle K. Lee
*Deputy Director of the United States Patent and Trademark Office*